(12) United States Patent
Jacobs et al.

(10) Patent No.: US 7,790,600 B2
(45) Date of Patent: Sep. 7, 2010

(54) SYNTHESIS OF ZEOLITE CRYSTALS AND FORMATION OF CARBON NANOSTRUCTURES IN PATTERNED STRUCTURES

(75) Inventors: Pierre Jacobs, Gooik (BE); Bert Sels, Balen (BE); Jasper Van Noyen, Antwerp (BE); Caroline Whelan, Hanret (BE); Karen Maex, Herent (BE); Filip de Clippel, Aarschot (BE)

(73) Assignees: IMEC, Leuven (BE); Katholieke Universiteit Leuven, Leuven (BE)

( * ) Notice: Subject to any disclaimer, the term of this patent is extended or adjusted under 35 U.S.C. 154(b) by 71 days.

(21) Appl. No.: 12/358,063

(22) Filed: Jan. 22, 2009

(65) Prior Publication Data

US 2009/0243103 A1 Oct. 1, 2009

Related U.S. Application Data

(60) Provisional application No. 61/029,286, filed on Feb. 15, 2008.

(30) Foreign Application Priority Data

May 2, 2008 (EP) .................................. 08155596

(51) Int. Cl.
*H01L 21/4763* (2006.01)
(52) U.S. Cl. ...................... 438/618; 438/610; 257/746; 257/E23.168; 257/E21.585
(58) Field of Classification Search ................. 438/610, 438/618; 257/746, E23.168, E21.585
See application file for complete search history.

(56) References Cited

U.S. PATENT DOCUMENTS 6,620,402 B2 * 9/2003 Jacobsen et al. ............ 423/716

(Continued)

OTHER PUBLICATIONS

Deng et al. "Molecular sieve encapsulated single walled carbon nanotubes" The Electrochemical Society, Mar. 23, 2006, URL: http://www.electrochem.org/dl/ma/203/pdfs/1468.pdf.

(Continued)

*Primary Examiner*—Fernando L Toledo
*Assistant Examiner*—Ankush K Singal
(74) *Attorney, Agent, or Firm*—Knobbe Martens Olson & Bear LLP

(57) ABSTRACT

A method is provided for incorporating zeolite crystals in patterned structures, the zeolite crystals having pores (channels) with an orientation which is defined by the topology of the zeolite crystal type and the geometry of the patterned structure, resulting in pores parallel with the length axis of the patterned structures. The patterned structures may be vias (vertical contacts) and trenches (horizontal lines) in a semiconductor substrate. These zeolite crystals can advantageously be used for dense and aligned nanocarbon growth or in other words growth of carbon nanostructures such as carbon nanotubes (CNT) within the pores of the zeolite structure. The growth of CNT is achieved within the porous structure of the zeolite crystals whereby the pores can be defined as confined spaces (channels) in nanometer dimensions acting as a micro-reactor for CNT growth. A method for growing carbon nanostructures within zeolite crystals is also provided, by adding, after creation of the zeolite crystals, a novel compound within the porous structure of the zeolite crystals whereby said novel compound is acting as a carbon source to create the carbon nanostructures. The improved growth method gives a significantly higher carbon density (yield) compared to state of the art techniques.

20 Claims, 15 Drawing Sheets

U.S. PATENT DOCUMENTS

| | | | |
|---|---|---|---|
| 7,005,118 B2 * | 2/2006 | Terres Rojas et al. | 423/702 |
| 7,303,989 B2 * | 12/2007 | Boyanov et al. | 438/637 |
| 2006/0216221 A1 * | 9/2006 | Lee | 423/447.3 |
| 2008/0317631 A1 * | 12/2008 | Farrow et al. | 422/68.1 |
| 2010/0021650 A1 * | 1/2010 | Kadono et al. | 427/534 |

OTHER PUBLICATIONS

Burghard, M. "Carbon Nanotubes by Quantitative Solid-State Conversion of an Organometallic Precursor" Angewandte Chemie International Edition, vol. 42, No. 48, Dec. 10, 2003, pp. 5929-5930.

Yu et al. "Efficient synthesis of carbon nanotubes over rare earth zeolites by thermal chemical vapor deposition at low temperatures" Diamond and Related Materials, vol. 15, No. 9, Sep. 2006, pp. 1261-1265.

Tang et al. "Mono-sized single-wall carbon nanotubes formed in channels of AlPO4-5 single crystal" Appl. Phys. Lett. 73, 2287 (1998).

Urban et al. "Production of carbon Nanotubes inside the pores of mesoporous silicates" Chemical Physics Letters, vol. 359, Apr. 16, 2002, pp. 95-100.

Sun et al. "Synthesis and Raman characterization of mono-sized single-wall carbon nanotubes in one-dimensional channels of AlPO4-5 crystals" Applied Physics A Materials Science & Processing, vol. 69, No. 4, Jun. 24, 1999, pp. 381-384.

Davis, M. "Ordered Porous Materials for Emerging Applications" Nature, vol. 417, Jun. 20, 2002, pp. 813-821.

Wang et al. "Single-walled 4 Å carbon nanotube arrays" Nature, vol. 408, Nov. 2, 2000, pp. 50-51.

Balkus Jr. et al. Studies in Surface Science and Catalysis, 154, 903-910, 2004.

Corma et al. Microelectronic Engineering (2008), doi: 10.1016/j.mee.2008.01.061.

Hayashi et al. Nano Letters, 3, 887-889, 2003.

Kyotani et al. Chemistry of Materials, 8, 2109-2113, 1996.

Parton et al. Journal of Molecular Catalysis A: Chemical, 97: 183-186, 1994.

Qin et al. Nature, 408, 50, 2000.

Tang et al. Applied Physics Letters, 73, 2287-2289, 1998.

Urban et al. Chemical Physics Letters, 359, 95-100, 2002.

Wang et al. Nature, 408, 50-51, 2000.

* cited by examiner

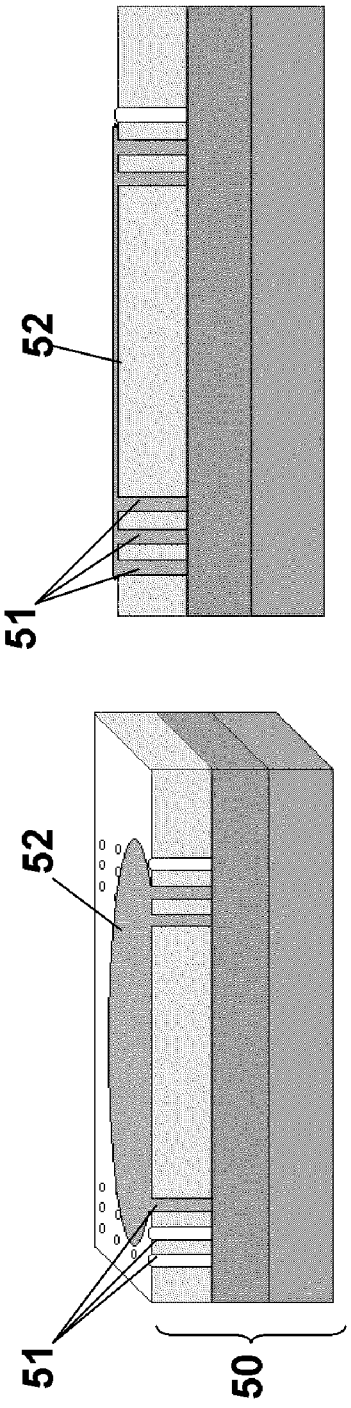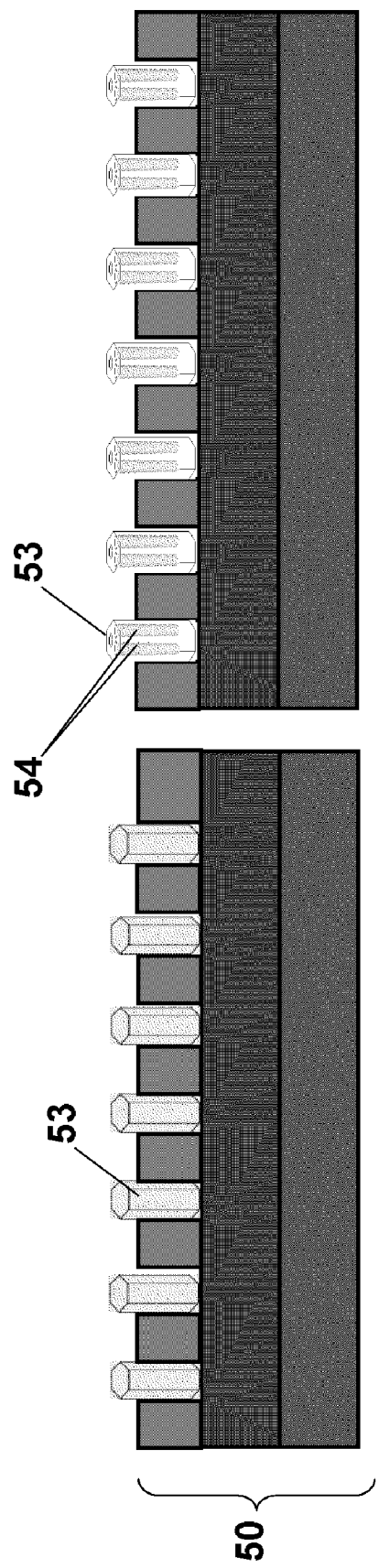

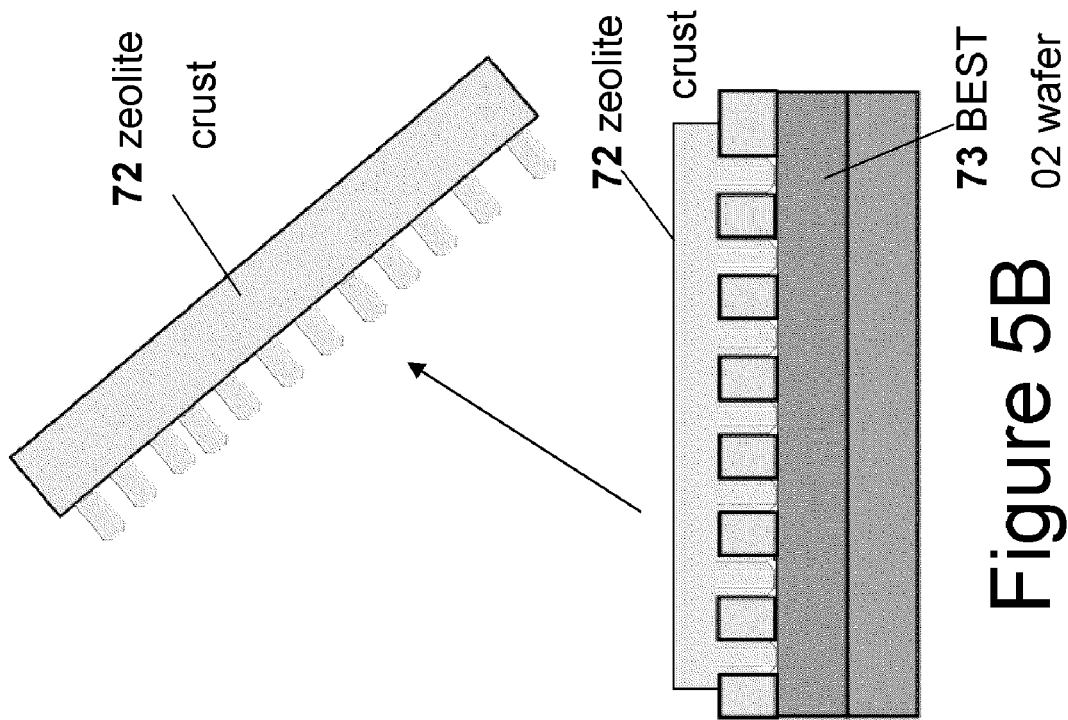
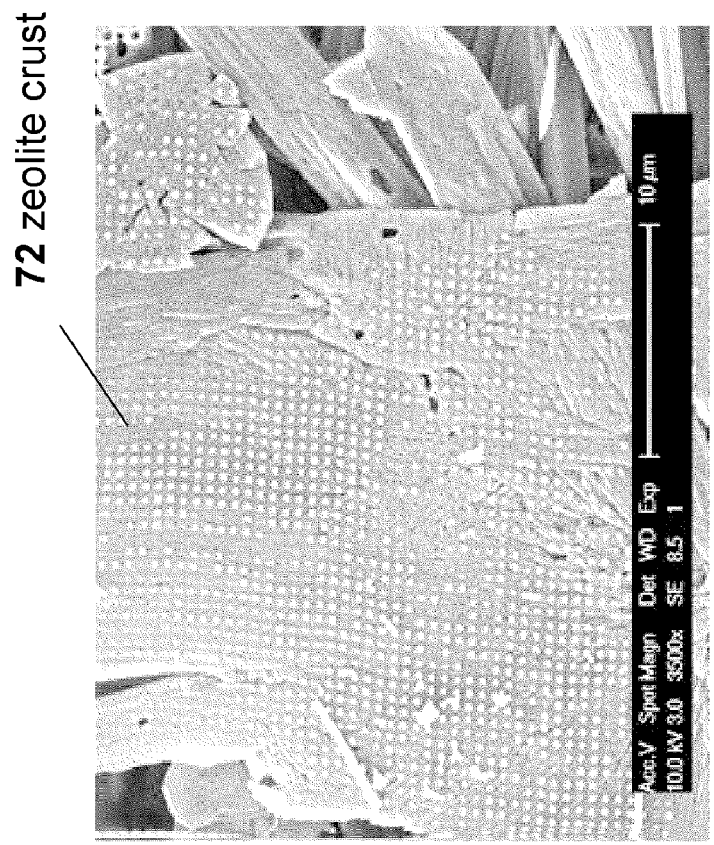
Figure 5B
Figure 5A

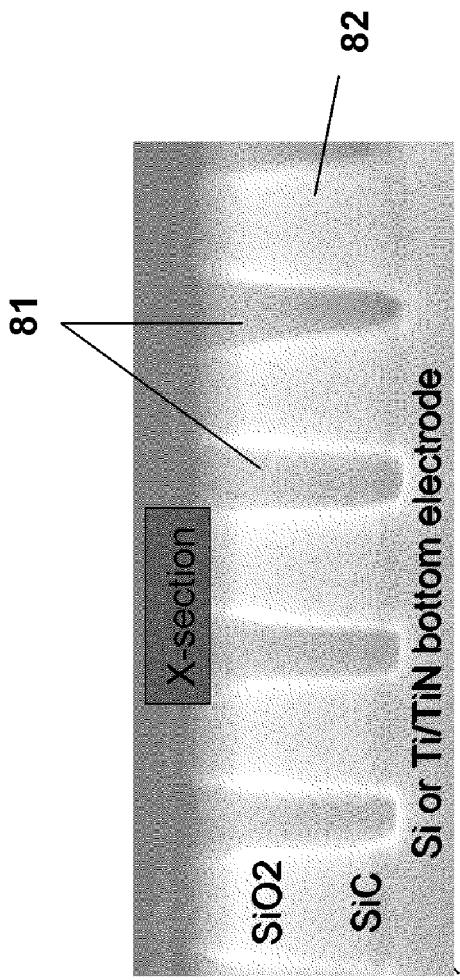
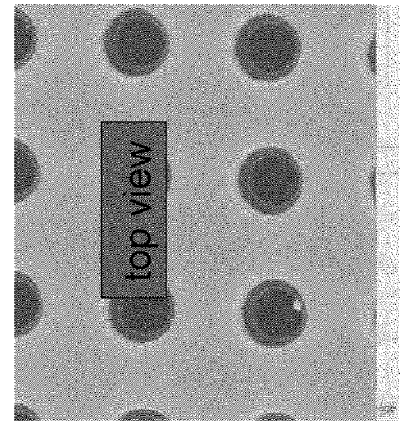
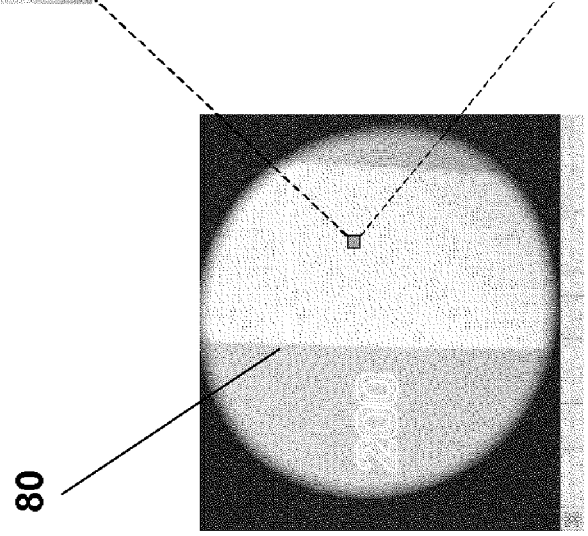
Figure 12C
Figure 12B
Figure 12A

_US 7,790,600 B2_

SYNTHESIS OF ZEOLITE CRYSTALS AND FORMATION OF CARBON NANOSTRUCTURES IN PATTERNED STRUCTURES

CROSS-REFERENCE TO RELATED APPLICATIONS

This application claims the benefit under 35 U.S.C. §119 (e) of U.S. provisional application Ser. No. 61/029,286 filed Feb. 15, 2008, and claims the benefit under 35 U.S.C. §119 (a)-(d) of European application No. 08155596.3 filed May 2, 2008, the disclosures of which are hereby expressly incorporated by reference in their entirety and are hereby expressly made a portion of this application.

FIELD OF THE INVENTION

Patterned structures comprising zeolite crystals and a method for the synthesis of these zeolite crystals in the patterned structures are provided, as is a method to form carbon nanostructures such as carbon nanotubes (CNT) in high yields inside the zeolite crystals. A method is provided to synthesize carbon nanostructures within the parallel pores of a zeolite crystal thereby making use of an organo-metal complex introduced via impregnation or in situ synthesis so ensuring 100% pore filling and high efficiency for synthesis of resulting carbon nanostructures; the metal being useful to initiate the growth of the carbon nanostructures. The methods and structures are useful in the field of semiconductor processing and the use of carbon nanostructures in zeolite crystals within patterned structures such as trenches and/or vias as interconnect structures in a semiconductor device. Hybrid systems of interconnect structures are provided wherein both copper and carbon nanostructures are used as conductive material within vias and trenches. The methods and structures are also useful in the field of wafer stacking (3D applications), sensor applications (CNT acting as micro-electrode array), heat dissipation and fuel cells. A method is provided for integrating zeolite crystals in patterned structures (e.g. within trenches and vias on a semiconductor substrate), and using the zeolite crystals for the synthesis of carbon nanostructures such that the carbon nanostructures can be used as interconnects in a semiconductor device, as is to a method for integrating zeolite crystals in patterned structures in a semiconductor device.

BACKGROUND OF THE INVENTION

Carbon Nanotubes (CNT) are good candidates to replace copper for use as interconnect lines (trenches) and vias in future semiconductor devices. It is shown that for relevant interconnect lengths the resistance of the optimal CNT interconnect is about an order of magnitude smaller than the resistance of a copper interconnect. When fully ballistic transport can be achieved in the carbon nanotubes, the improvement in resistance is larger, up to several orders of magnitude.

To achieve the electrical requirements set out by the International Technology Roadmap for Semiconductors (ITRS), for Back End Of Line (BEOL) interconnect trenches (lines) and vias, high quality straight horizontal and vertical metallic single-walled carbon nanotubes (SW-CNT) of very small diameter are required in extremely high density bundles (when arranged in a hexagonal packing configuration, the highest theoretically feasible CNT density is 2 CNT/nm2 assuming a tube diameter of 0.4 nm and an interspacing of 0.34 nm). The synthesis of ultra-small diameter carbon nanotubes (CNTs) necessary for achieving these very high densities of isolated SW-CNT, is up till now reported in confined circumstances e.g. by Wang et al. (Nature, 408, 50-51, 2000), by Qin et al. (Nature, 408, 50, 2000), by Hayashi et al. (Nano Letters, 3, 887-889, 2003), by Balkus Jr. et al. (Studies in Surface Science and Catalysis, 154, 903-910, 2004), and by Corma et al. (Microelectronic Engineering (2008), doi: 10.1016/j.mee.2008.01.061). The confinement effect of a mono dimensional pore seems to be crucial to synthesize the desired diameter nanotube.

Carbon nanostructures have been made in prior art by the template technique, using porous Alumina Oxide (AAO) as reported by Kyotani et al. (Chemistry of Materials, 8, 2109-2113, 1996), using mesoporous materials such as MCM-41 as reported by Urban et al. (Chemical Physics Letters, 359, 95-100, 2002) or using an AFI type zeolite as reported by Tang et al. (Applied Physics Letters, 73, 2287-2289, 1998).

Since zeolites have high pore densities in agreement with the strict requirements for CNT, they are very good candidates to produce highly dense aligned and isolated CNT within these pores. However to really exploit the interesting properties of zeolites for carbon nanostructure growth in patterned structures such as trenches and vias, zeolite growth must be integrated in the CMOS technology platform.

Furthermore, high yields of carbon nanostructure growth must be achieved. In prior art the highest pore filling degree reported is 28% by addition of hydrocarbon gas during pyrolysis. The addition of complexes to the zeolite synthesis solution or gel has been reported. However to allow zeolite crystallization, the concentration of these complexes in the zeolite synthesis gel or solution should be low, resulting in inefficient growth of carbon nanostructures (Studies in Surface Science and Catalysis, Vol. 154, pp. 903).

SUMMARY OF THE INVENTION

There is a need for a method to incorporate zeolite crystals within patterned structures such as trenches and vias and an adapted synthesis method to grow carbon nanostructures with significantly higher yields within the pores of the zeolite crystals and integrate the resulting material in Si technology.

A method is provided to incorporate zeolite crystals in patterned structures. In accordance with an aspect of the preferred embodiments the zeolite crystals having pores (channels) with an orientation which is defined by the topology of the zeolite crystal type and the geometry of the patterned structure resulting in pores parallel with the length axis of the patterned structures. Said patterned structures may be vias (vertical contacts) and trenches (horizontal lines) in a semiconductor substrate. Furthermore it is an advantage to use these zeolite crystals for dense and aligned nanocarbon growth or in other words growth of carbon nanostructures such as carbon nanotubes (CNT) within the pores of the zeolite structure. The growth of CNT is achieved within the porous structure of the zeolite crystals whereby the pores can be defined as confined spaces (channels) in nanometer dimensions acting as a micro-reactor for CNT growth.

Also provided is an improved method for growing carbon nanostructures within zeolite crystals by adding, after creation of the zeolite crystals, a novel compound within the porous structure of the zeolite crystals whereby said novel compound is acting as a carbon source to create the carbon nanostructures. The improved growth method gives a significantly higher carbon density (yield) compared to state of the art techniques.

New zeolite topologies and nanocarbon synthesis techniques are provided resulting in significantly improved yields of intraporous carbon nanostructure growth.

The methods of preferred embodiments offer advantages over state of the art techniques to position zeolite crystals in patterned structures. The methods of preferred embodiments accomplish this by first substantially filling the patterned structures with the zeolite synthesis solution or gel using mechanical forces before the crystallization of the synthesis gel to form zeolite crystals.

The methods of preferred embodiments are further advantageous over prior art methods (e.g. Vapor Liquid Solid (VLS) enhanced growth) to grow carbon nanostructures because lower growth temperatures may be used and no catalyst nanoparticles need to be deposited to initiate the growth of carbon nanostructures.

Furthermore the methods of preferred embodiments have the advantage that the predetermined size and geometry of the pores within the pores of the zeolite can be used to determine the diameter and hence properties of the synthesized carbon nanostructures (e.g. SW-CNT versus MW-CNT).

The methods of preferred embodiments for providing carbon nanostructures within patterned structures further have the advantage over state of the art techniques to grow easily carbon nanostructures in horizontal direction e.g. along the length of a trench. Using methods of the preferred embodiments it is possible to direct the zeolite crystal growth (and hence orient the pores within the structure of the zeolite) in a direction defined by the confinement of the structures. In other words it may be defined by the geometric parameters (depth versus length) of the patterned structure. In this way it is possible to achieve direct vertical growth of the zeolite crystal in a via (vertical hole), direct horizontal growth of the zeolite crystal in a trench (horizontal line). Hence it is possible to induce vertical or horizontal growth of carbon nanostructures inside zeolite pores.

Also provided is a method for integrating zeolite crystals comprising carbon nanostructures in a semiconductor device and the use of the carbon nanostructures as conductive material in interconnect structures such as trenches and vias.

In preferred embodiments, a substrate comprising patterned structures (openings) is provided wherein these patterned structures are filled with zeolite crystals wherein the zeolite crystals and hence pores within the zeolite have an orientation in the direction defined by the confinement of the patterned structures.

According to a first aspect, a method is provided for providing zeolite crystals within patterned structures. The method for providing zeolite crystals within patterned structures comprises at least the steps of: providing a substrate comprising in its top surface patterned structures (openings), impregnating a zeolite synthesis solution or gel onto the substrate followed by, applying mechanical forces to incorporate the synthesis solution into the patterned structures, applying hydrothermal conditions to crystallize the zeolite synthesis solution to form zeolite crystals, rinsing and drying the substrate, and optionally applying additional mechanical forces to remove non-incorporated or non-attached zeolite crystals.

According to preferred embodiments the method to incorporate zeolite crystals within patterned structures is used for dense and aligned growth of carbon nanostructures (e.g. CNT) within the pores of the zeolite structure. The method to grow carbon nanostructures within patterned structures using zeolite crystals comprises after the steps of providing the zeolite crystals within the patterned structures as described above at least the step of heating the zeolite crystals in the presence of an inert gas or a mixture of an inert gas and a carbon containing gas at a temperature between 350° C.-1000° C.

The method for providing zeolite crystals in patterned structures and subsequently grow carbon nanostructures within the pores of the zeolite comprises at least the steps of: providing a substrate comprising on its top surface patterned structures (openings), impregnating a zeolite synthesis solution or gel onto the substrate followed by, applying mechanical forces to incorporate the synthesis solution into the patterned structures, applying hydrothermal conditions to crystallize the zeolite from the synthesis solution or gel, rinsing and drying the substrate, and optionally applying mechanical forces to remove non-incorporated or non-attached zeolite crystals, and heating the zeolite crystals in the presence of an inert gas or a mixture of an inert gas and a carbon containing gas at a temperature between 350° C.-1000° C. to grow the carbon nanostructures.

According to a second aspect, an improved method is provided to grow carbon nanostructures (e.g. CNT) within the pores of a zeolite crystal. The improved method gives rise to significantly higher yields of intraporous nanocarbon growth compared to the prior art techniques. The highest achieved (reported) pore filling degree in prior art is 28% by addition of hydrocarbon gas during pyrolysis. Using the method of the preferred embodiments, pore filling degrees of 60% and more are achieved without addition of hydrocarbon gas during pyrolysis. The improved method makes use of organo-metal complexes which are incorporated into the pores of the zeolite crystals after the step of forming the zeolite crystal and which are used as initiator and carbon source for the subsequent step of carbon nanostructure growth.

The organo-metal complex according to the preferred embodiments may be introduced in the zeolite crystal pores by impregnation or in-situ synthesis. Addition of organo-metal complexes to the zeolite synthesis solution or gel has been described in prior art by Balkus Jr. et al. However the organo-metal complex was always added before zeolite crystallization. Using the method according to the prior art, the concentration of the complexes in the zeolite synthesis gel or solution should be low to allow zeolite crystallization, resulting in inefficient loading with carbon nanostructures.

The organo-metal complex of the preferred embodiments is preferably a (metallo)-phthalocyanine complex. Phthalocyanines may be incorporated in extra large pore zeolites such as VFI type zeolites and can be converted into carbon nanostructures under pyrolysis conditions.

Preferred examples of suitable phthalocyanine complexes are Ni-, Fe-, Co-, or even H2-phthalocyanine complexes, for example Fe-phthalocyanine.

According to preferred embodiments, the improved method to grow the carbon nanostructures (e.g. CNT) within the pores of a zeolite crystal comprises at least the steps of: providing a zeolite synthesis solution or gel followed by, applying hydrothermal conditions to crystallize the zeolite synthesis solution to form zeolite crystals, heating the zeolite crystals and evaporating or impregnating a solid source or precursor of phthalocyanine and a metal at a temperature between 0° C.-400° C. such that the phthalocyanine and the metal form a metal-phthalocyanine complex within the pores of the zeolite crystals, and growing carbon nanostructures using the metal-phthalocyanine complex as an initiator by heating at a temperature between 350-1000° C.

The improved method to grow the carbon nanostructures (e.g. CNT) within the pores of a zeolite crystal is compatible with the method to grow zeolite crystals within patterned structures as described above. According to preferred embodiments, the improved method to grow the carbon nanostructures (e.g. CNT) within the pores of a zeolite crystal and wherein the zeolite crystals are present in patterned structures comprises at least the steps of: providing a substrate comprising on its top surface patterned structures (openings), impregnating a zeolite synthesis solution or gel onto the substrate followed by, applying mechanical forces to incorporate the synthesis solution into the patterned structures, applying hydrothermal conditions to crystallize the zeolite synthesis solution to form zeolite crystals, rinsing and drying the substrate, and optionally applying mechanical forces to remove non-incorporated or non-attached zeolite crystals, heating the zeolite crystals and evaporating or impregnating a solid source or precursor of phthalocyanine and a metal at a temperature between 0° C.-400° C. such that the phthalocyanine and the metal are forming a metal-phthalocyanine complex within the pores of the zeolite crystals, and growing carbon nanostructures using the metallo-phthalocyanine complex as an initiator by heating at a temperature between 350-1000° C.

According to preferred embodiments, the substrate may be any suitable substrate which is chosen in function of further applications. For semiconductor applications (use within a semiconductor device) the substrate may be a semiconductor substrate such as a Si or Ge wafer.

According to preferred embodiments, the patterned structures may be trenches or via holes which may be patterned in a dielectric layer having a k value lower than 5. Examples of suitable dielectric layers are silicon dioxide and other state of the art low-k materials such as Black Diamond (Applied Materials). The patterning of the structures may be achieved using a combination of photolithographic imaging and (anisotropic) dry etching. To be used in BEOL as interconnect structures, the trenches and vias have preferably a diameter in the range of 50 nm up to 300 nm. Trenches have an aspect ratio (length/depth) greater than 1 whereas vias have an aspect ratio (length/depth) smaller than 1.

According to preferred embodiments, the patterned structure may be a single level mask structure with vias ranging from 50 nm up to 300 nm in diameter. In order to allow electrical characterization or electrical contact of the carbon nanostructures in an individual via and/or an array of vias, the vias may land on a single common bottom electrode that can be made from a suite of different materials. An example of a suitable bottom contact electrode material is TiN. Using a simple patterned structure design facilitates the vertical CNT growth in zeolites confined within the vias, their integration with the bottom contact and top-metallization to enable consequent electrical contact of the CNT.

According to preferred embodiments the zeolite synthesis solution or gel may comprise a silicon source and an alkali source of inorganic or organic nature, and optionally a template molecule and hetero-elements such as Al, Ga, Ti, Fe, Co, Ge, P, or a mixture thereof.

According to preferred embodiments the zeolite synthesis solution or gel may comprise an aluminum and phosphorus source, as well as a source of acidity, and a template molecule and optionally hetero-elements such as Si, Ga, Ti, Fe, Co, Ge, or a mixture thereof. As an example for the SAPO-5 zeolite type material (also referred to as AFI type) aluminum-isopropoxide is used as an aluminum source, phosphoric acid as a phosphorus source, tripropylamine (TPA) as template, and Aerosil200 (Degussa) as a silica source. The synthesis gel is preferably a water-based solution; alcohols such as ethanol may be added to improve the wetability of the gel. An optimized synthesis gel for a silico-aluminophosphate may have the following composition: 1 $Al_2O_3$:0.99 $P_2O_5$:1.2 TPA:400 $H_2O$:20 Ethanol:0.01 $SiO_2$.

According to preferred embodiments, the organo-metal complex, used for impregnation or in-situ synthesis in the zeolite pores, may consist of a transition metal in comprising Fe, Ni or Co and any organic ligand that sterically can be accommodated in the zeolite pores.

According to preferred embodiments the zeolite can be a crystalline porous material with parallel pores, preferably with one of the following structure types, as defined by the International Zeolite Association: AFI, VFI type material. Alternatively an AEL type, AET type, AFO type, AFR type, AFS type, AFY type, ASV type, ATO type, ATS type, *BEA type, BEC type, BOG type, BPH type, CAN type CFI type, -CLO type, CON type, DON type, DFO type, EMT type, EON type, ETR type, EUO type, EZT type, FAU type, FER type, GME type, GON type, IFR type, IMF type, ISV type, IWR type, IWV type, IWW type, LTA type, LTL type, MAZ type, MEI type, MEL type, MFI type, MFS type, MOR type, MOZ type, MSE type, MTT type, MTW type, MWW type, OFF type, OSI type, OSO type, PON type, RRO type, RWY type, SAO type, SBE type, SBS type, SBT type, SFE type, SFF type, SFG type, SFH type, SFN type, SFO type, SOS type, SSY type, STF type, SZR type, TER type, TON type, TUN type, USI type, UTL type, or VET type material can be used.

According to preferred embodiments the mechanical forces used to incorporate the synthesis gel are selected from sonication, vibration and/or spin-coating. Sonication may be used to incorporate the synthesis gel into the patterned structures, suitable sonication condition are e.g. 15 minutes at 47 kHz. Spin-coating may be used to remove excess of synthesis gel from the substrate, suitable spin-coating condition are e.g. 15000 rpm for 10 seconds.

According to preferred embodiments the hydrothermal treatment is used to crystallize the synthesis gel and thereby forming (ordered) zeolite crystals. Suitable hydrothermal conditions comprise the heating of the substrate under autogeneous pressure for 2-48 h at 100-200° C., more preferably for 14-15 h at 150-180° C.

According to preferred embodiments the rinsing and drying is performed using doubly-distilled water.

According to preferred embodiments the additional mechanical forces needed to remove non-incorporated or non-attached zeolite crystals is performed using sonication. After the sonication, the substrate is preferably again thoroughly rinsed with doubly-distilled water.

According to preferred embodiments the step of growing the carbon nanostructures is such that vertical growth of carbon nanostructures is achieved in a via (vertical hole) and horizontal growth of carbon nanostructures is achieved in a trench (horizontal line).

According to preferred embodiments the step of growing the carbon nanostructures is achieved using high temperature pyrolysis conditions. The carbon source needed for the nanostructure synthesis may originate from the organic template molecule used for zeolite synthesis. Alternatively (or additionally) a carbon containing gas may be added to the atmosphere under pyrolysis conditions (possibly in high pressure conditions). Yet another alternative is the formation of organo-metal complexes within the porous structure of the zeolite crystal (such as metal phthalocyanine complexes) leading to a stacking of these organo-metal complexes inside the zeolite pores.

According to preferred embodiments the pyrolysis step used to grow carbon nanostructures is performed within a thermal reactor e.g. a furnace. The reactor must be capable of heating the zeolite crystals to a temperature up to 1000° C. The thermal reactor preferably includes a chamber that can be maintained at vacuum or at a desired pressure, and further includes means for enabling a gas flow into the chamber. Preferred pyrolysis may be the heating of the zeolite crystals under a flow of inert gas. Then keep the zeolite crystals isothermal at 400-900° C. for 10-3600 min, more preferably at 550° C. for 50-150 min.

The above and other characteristics, features and advantages of the present invention will become apparent from the following detailed description, taken in conjunction with the accompanying drawings, which illustrate, by way of example, the principles of the invention. This description is given as an example only, without limiting the scope of the invention. The reference figures quoted below refer to the attached drawings.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 2A and 2B illustrate a cross section of a substrate having patterned structures (openings) e.g. a BEST02 pattern with impregnated synthesis gel on top of the substrate.

FIG. 2C illustrates a cross section of the substrate having patterned structures after sonication (vibration) and hydrothermal treatment to obtain zeolite crystals inside the patterned structures.

FIG. 2D illustrates a cross section of the substrate having patterned structures filled with zeolite crystals after performing pyrolysis to obtain carbon nanostructures inside the pores of the zeolite crystals.

FIG. 5A is a SEM image of the bottom side of a piece of zeolite crust grown on BEST02 patterned wafer and FIG. 5B illustrates a schematic view of the zeolite crust and related BEST02 patterned wafer.

FIG. 12A to FIG. 12C shows the test structure design according to the BEST02 as described above and used in the examples 1 to 5. FIG. 12A is a SEM photo illustrating a top view of the Si wafer substrate comprising the test structures, FIG. 12B illustrates a more detailed top view of the wafer substrate illustrating the via holes. FIG. 12C illustrates a cross section of the via holes in the Si substrate with a Ti/TiN contact electrode at the bottom of the vias.

DETAILED DESCRIPTION OF THE PREFERRED EMBODIMENT

Figure 1A:
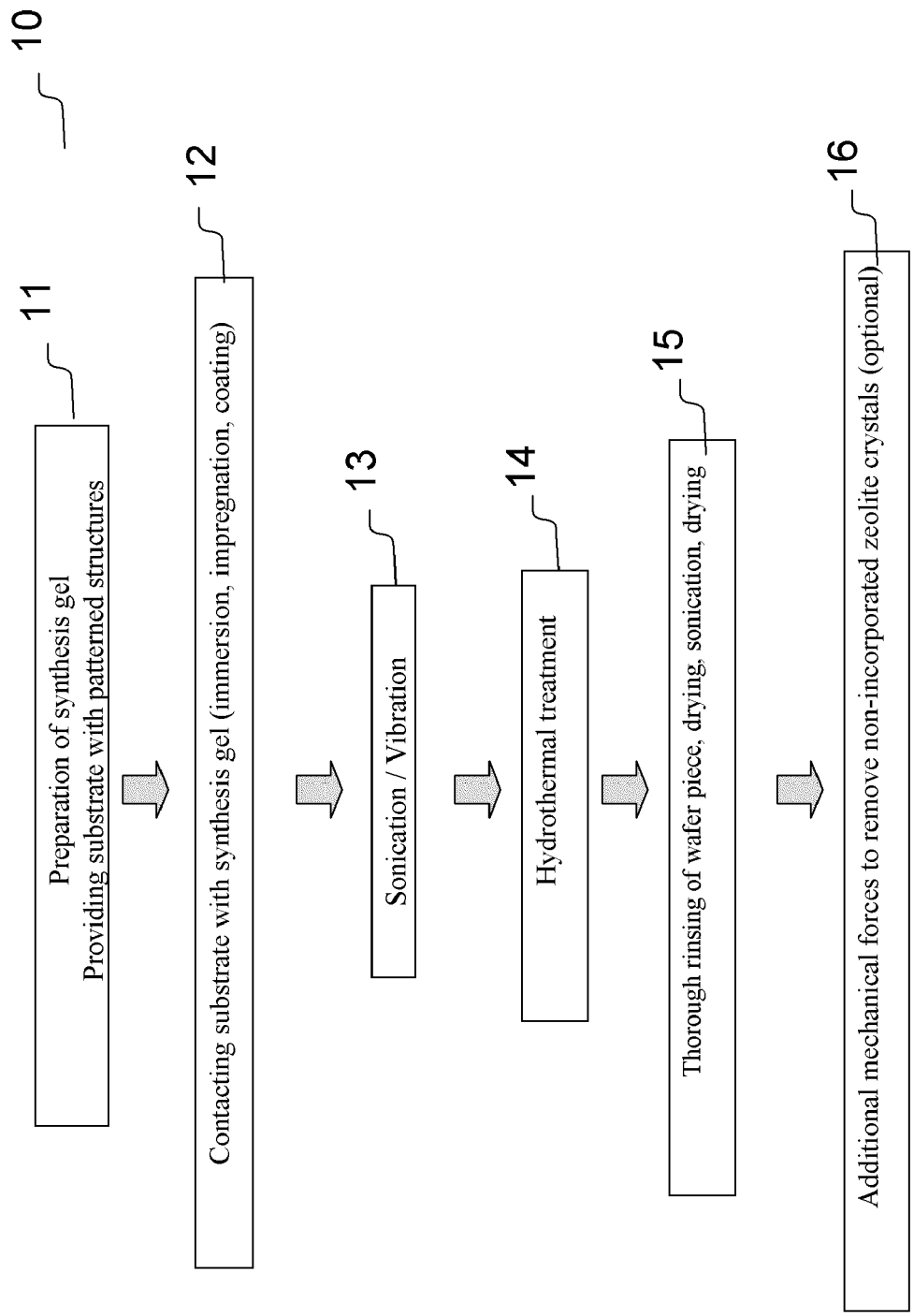
FIG. 1A is a flow diagram illustrating the different processing steps to synthesize zeolite crystals within patterned structures according to preferred embodiments.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

The terms top, bottom, over, under and the like in the description and the claims are used for descriptive purposes and not necessarily for describing relative positions. It is to be understood that the terms so used are interchangeable under appropriate circumstances and that the preferred embodiments described herein are capable of operation in other orientations than described or illustrated herein.

The term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a solution comprising components A and B" should not be limited to solution consisting only of components A and B. It means that with respect to the present invention, the only relevant components of the solution are A and B.

The term "template" as used herein is a broad term, and is to be given its ordinary and customary meaning to a person of ordinary skill in the art (and is not to be limited to a special or customized meaning), and refers without limitation to an organic zeolite-forming structure directing agent. This structure directing agent is typically an organic amine, such as tripropylamine (TPA), triethylamine, tetrapropylammonium hydroxide, tertraethylammonium hydroxide, triethyl-n-propylammonium hydroxide, 2-picoline, 3-picoline, 4-picoline, piperidine, N-methyldiethanolamine, and the like.

The terms "synthesis gel" or "synthesis solution" as used herein are broad terms, and are to be given their ordinary and customary meaning to a person of ordinary skill in the art (and are not to be limited to a special or customized meaning), and refer without limitation to a zeolite synthesis composition gel or solution which may comprise a silicon source and an alkali source of inorganic or organic nature, and optionally a template molecule and hetero-elements such as Al, Ga, Ti, Fe, Co, Ge, P, or a mixture thereof, or to refer to a zeolite synthesis composition gel or solution which may comprise an aluminum and phosphorus source, as well as a source of acidity, and optionally a template molecule and hetero-elements such as Si, Ga, Ti, Fe, Co, Ge, or a mixture thereof.

The term "carbon nanostructures" as used herein is a broad term, and is to be given its ordinary and customary meaning to a person of ordinary skill in the art (and is not to be limited to a special or customized meaning), and refers without limitation to both carbon nanoparticles as well as to carbon nanofibers and carbon nanotubes (CNTs) having a single-, double- or multi-wall structure referred to as SW-, DW- and MW-CNTs, respectively.

The term "porous structure" as used herein is a broad term, and is to be given its ordinary and customary meaning to a person of ordinary skill in the art (and is not to be limited to a special or customized meaning), and refers without limitation to a microporous structure having pores in the range up to 2 nm, a mesoporous structure having pores in the range of 2 nm up to 50 nm or a macroporous structure having pores in the range of 50 nm and larger.

Similarly it should be appreciated that in the description of exemplary preferred embodiments, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The invention will now be described by a detailed description of several preferred embodiments. It is clear that other preferred embodiments can be configured according to the knowledge of persons skilled in the art without departing from the true spirit or technical teaching of the invention, the invention being limited only by the terms of the appended claims.

According to a first aspect, methods are provided to form zeolite crystals within a patterned structure (within the openings of the pattern).

According to a preferred embodiment of the first aspect a method is provided for providing zeolite crystals within patterned structures. The method comprises at least the steps of: providing a substrate comprising in its top surface patterned structures (openings), impregnating a zeolite synthesis solution or gel onto the substrate followed by, applying mechanical forces to incorporate the synthesis solution into the patterned structures, applying hydrothermal conditions to crystallize the zeolite synthesis solution to form zeolite crystals, rinsing and drying the substrate, and optionally applying additional mechanical forces to remove non-incorporated or non-attached zeolite crystals.

FIG. 1A is a flowchart 10 illustrating the different processing steps to synthesize zeolite crystals within patterned structures according to a preferred embodiment of the first aspect. In a first step 11 the synthesis gel suitable for forming zeolite crystals and a substrate (e.g. wafer) comprising patterned structures (openings) in its top surface are provided according to state of the art methods. In a next step 12 the synthesis gel is contacted with the substrate by known methods such as immersion (dipping) of the substrate in the synthesis gel or coating of the synthesis gel onto the top surface of the substrate, Next, in step 13, mechanical forces such as sonication and/or vibration are used to incorporate the synthesis solution into the patterned structures. In a yet another next step 14 hydrothermal conditions are applied (heating) to crystallize the zeolite synthesis solution to form zeolite crystals within the patterned structures. Next, in step 15, the substrate comprising the zeolite crystals is rinsed and dried. In an additional (optional) step 16 additional mechanical forces can be applied to remove non-incorporated or non-attached zeolite crystals from the substrate.

Figure 3:
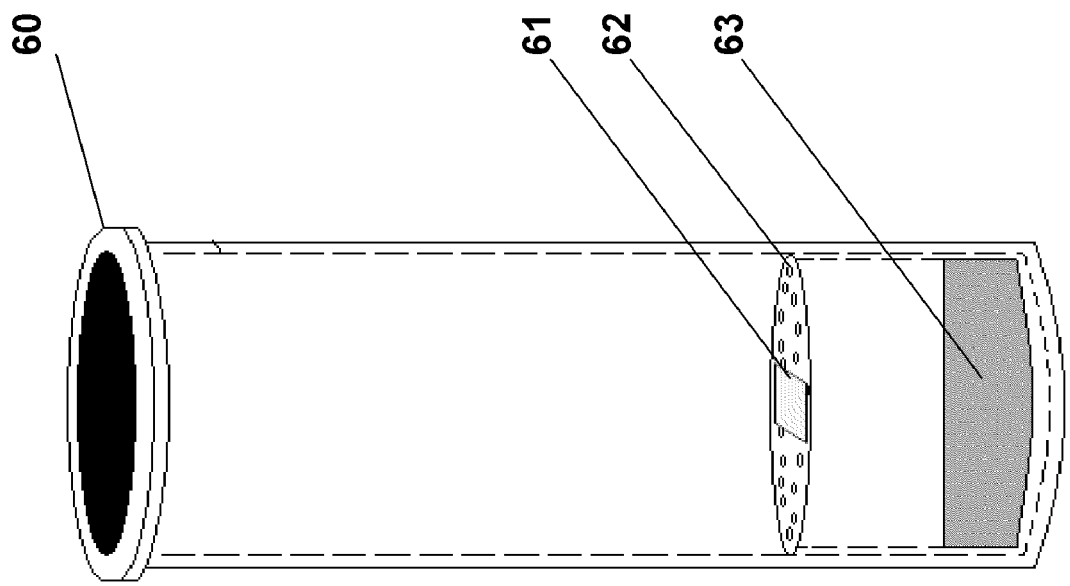
FIG. 3 illustrates a setup to perform the hydrothermal synthesis step according to preferred embodiments.
Figure 4:
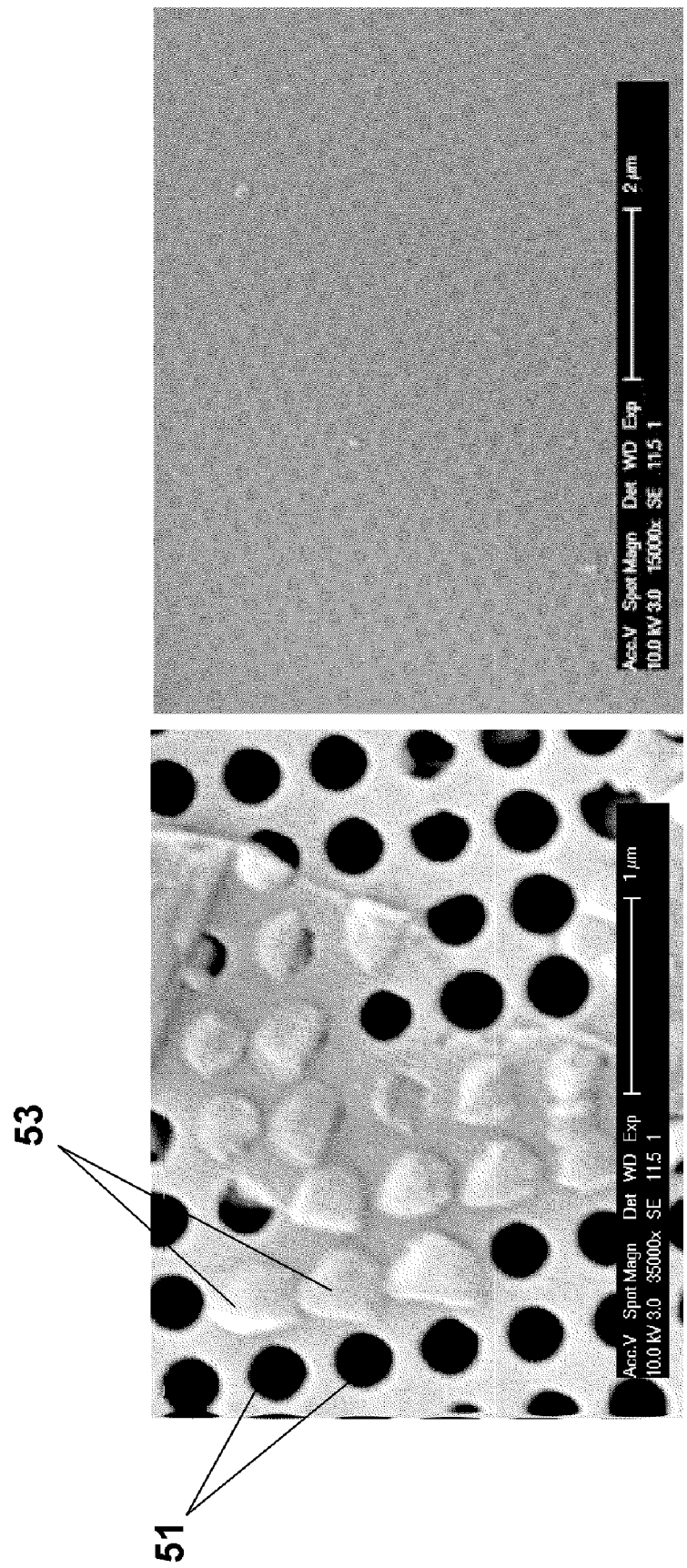
FIG. 4 is a Scanning Electron Microscopy (SEM) image of AlPO-5 crystals which were grown in via holes on a BEST02 patterned wafer.
Figure 6B:
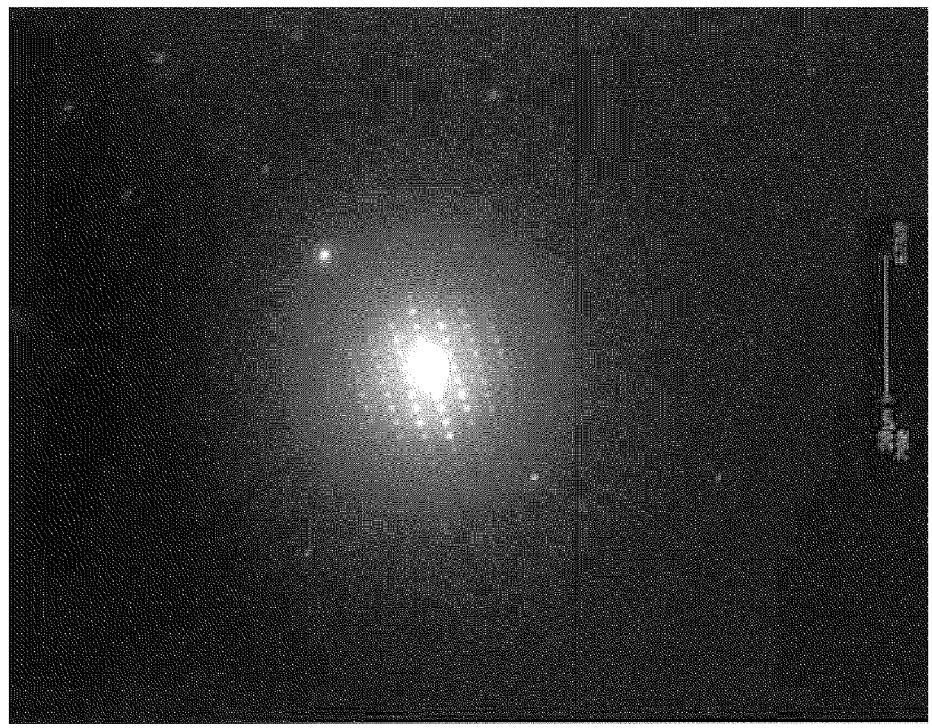
FIG. 6A is a transmission electron microscope (TEM) image and FIG. 6B is a TEM diffraction pattern of a zeolite piece on BEST02 patterned substrate.
Figure 6A:
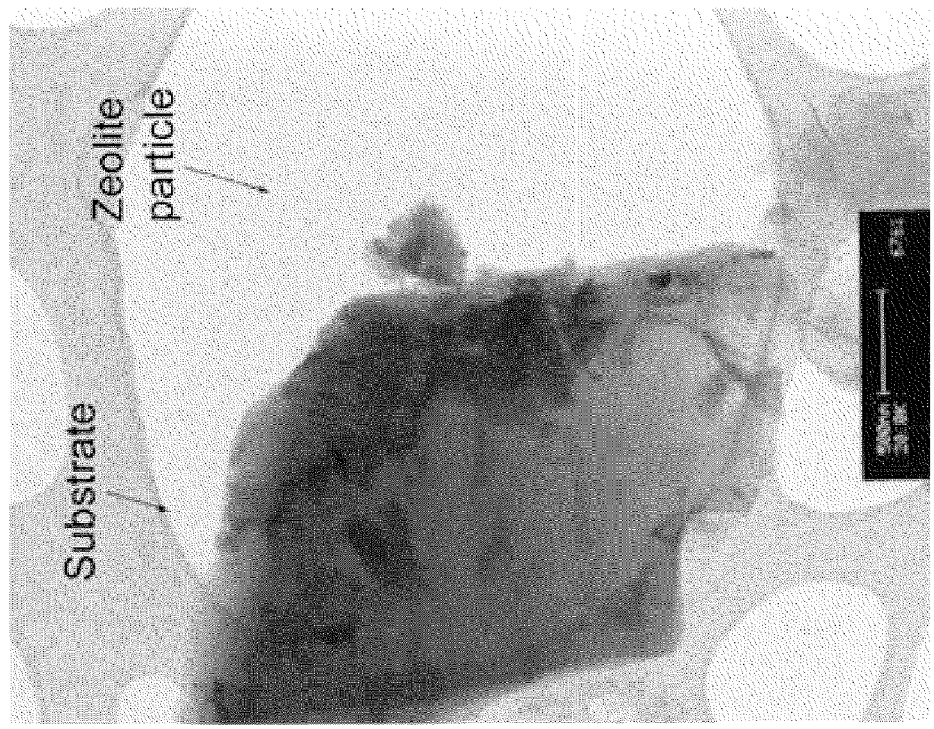

The step of performing hydrothermal conditions (heating) to crystallize the zeolite synthesis solution to form zeolite crystals may be performed in a stainless steel autoclave 60 as illustrated in FIG. 3. The experimental set-up of FIG. 3 comprises a Teflon substrate holder 62 on which a wafer piece (substrate comprising the patterned structure) is placed. The bottom of the reactor is filled with the synthesis gel 53 in which the wafer piece or substrate is immersed.

Figure 9:
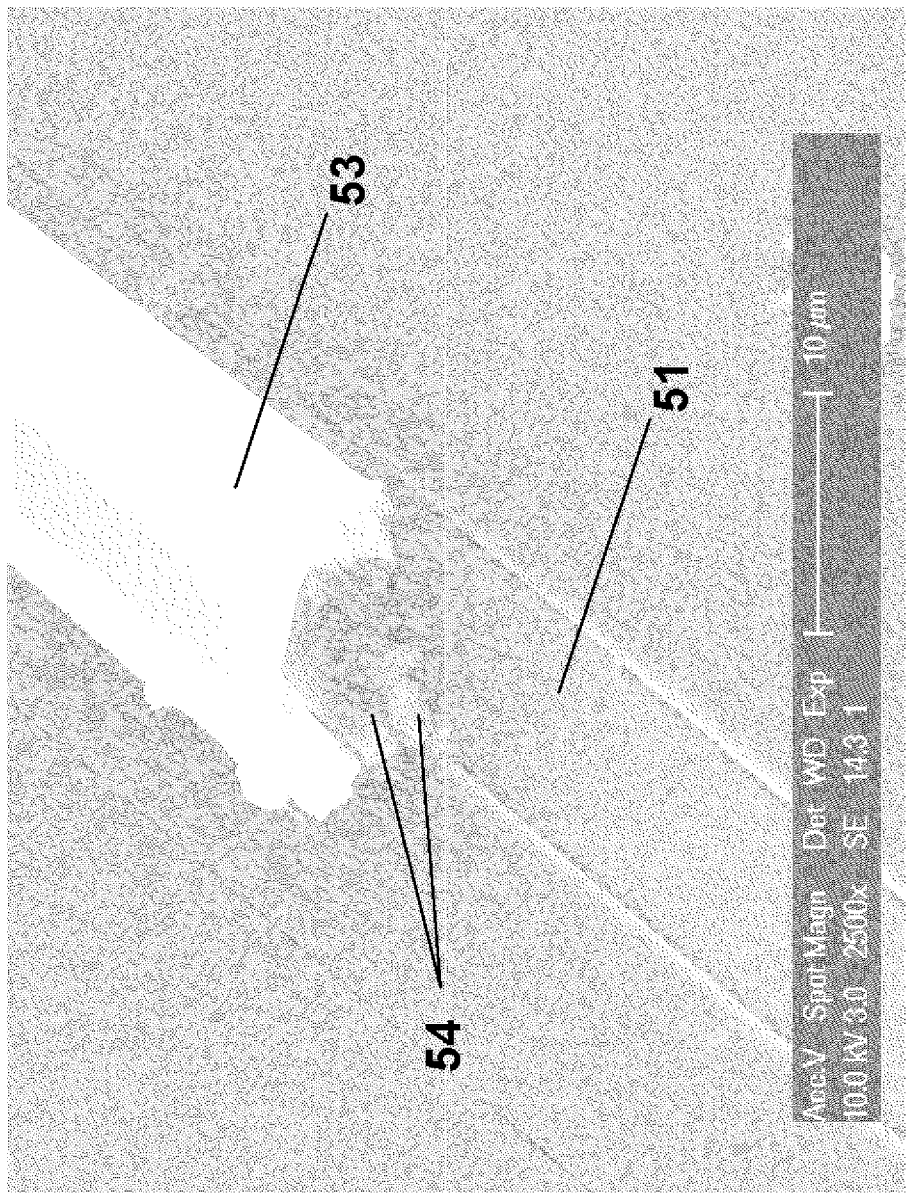
FIG. 9 is a SEM image of horizontally aligned zeolite crystal grown in trench structure in BEST02 patterned structures.

Using the method according to preferred embodiments of the first aspect it is possible to direct the zeolite crystal growth (and hence orient the pores within the structure of the zeolite) in a direction defined by the confinement of the patterned structures. In other words it may be defined by the geometric parameters (depth versus length) of the patterned structure. In this way it is possible to achieve direct vertical growth of the zeolite crystal in a via (vertical hole), direct horizontal growth of the zeolite crystal in a trench (horizontal line). FIG. 9 is a SEM image of a horizontally aligned zeolite crystal grown in an (horizontal) trench structure in BEST02 pattern. With growing horizontally onto the substrate is meant that, when the substrate is lying in a plane, the zeolite crystals grow in a direction substantially parallel to the plane of the substrate. With growing vertically onto the substrate is meant that, when the substrate is lying in a plane, the zeolite crystals grow in a direction substantially perpendicular to the plane of the substrate.

According to preferred embodiments of the first aspect a substrate comprising patterned structures (openings) wherein said patterned structures comprise zeolite crystals and the zeolite crystals have an orientation in the direction defined by the confinement of the patterned structures is disclosed. The patterned structures may be trenches or via holes in a semiconductor device.

The first aspect as described in a first preferred embodiment can be accomplished to form elongated carbon nanostructures (e.g. carbon nanotubes) within the pores of the zeolite crystals as described below in further preferred embodiments. The growth of these carbon nanostructures is performed by heating the zeolite crystals formed according to the first embodiment in the presence of a carbon comprising gas at a temperature range 350-1000° C.

Figure 1B:
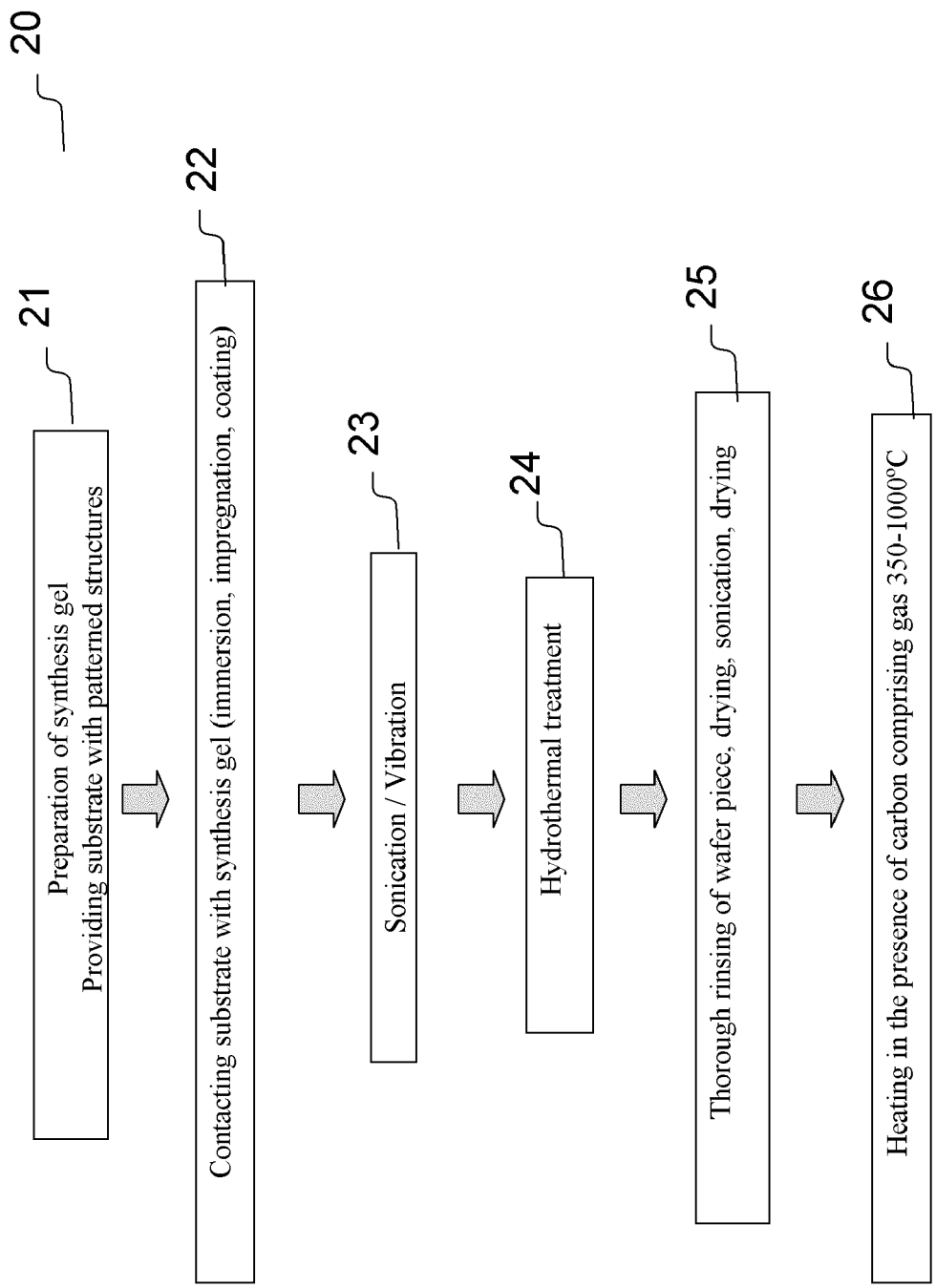
FIG. 1B is a flow diagram illustrating the different processing steps to synthesize zeolite crystals within patterned structures and subsequent growth of carbon nanostructures within the pores of the zeolite crystals by heating the zeolite crystals in the presence of a carbon comprising gas according to preferred embodiments.

According to further preferred embodiments of the first aspect, a method is provided for growing (aligned) carbon nanostructures within the pores of zeolite crystals within patterned structures. The method comprises at least the steps of: providing a substrate comprising in its top surface patterned structures (openings), impregnating a zeolite synthesis solution or gel onto the substrate followed by, applying mechanical forces to incorporate the synthesis solution into the patterned structures, applying hydrothermal conditions to crystallize the zeolite synthesis solution to form zeolite crystals, rinsing and drying the substrate, and optionally applying additional mechanical forces to remove non-incorporated or non-attached zeolite crystals, and heating the zeolite crystals in the presence of an inert gas or a mixture of an inert gas and a carbon containing gas at a temperature between 350° C.-1000° C. to grow the carbon nanostructures FIG. 1B is a flowchart 20 illustrating the preferred processing steps to first synthesize zeolite crystals within patterned structures followed by carbon nanostructure growth in the pores of the zeolite crystals according to preferred embodiments of the first aspect. In a first step 21 the synthesis gel suitable for forming zeolite crystals and a substrate (e.g. wafer) comprising patterned structures (openings) in its top surface are provided according to state of the art methods. In a next step 22 the synthesis gel is contacted with the substrate by known methods such as immersion (dipping) of the substrate in the synthesis gel or coating of the synthesis gel onto the top surface of the substrate. In a next step 23 mechanical forces such as sonication and/or vibration are used to incorporate the synthesis solution into the patterned structures. In yet another next step 24 hydrothermal conditions are applied (heating) to crystallize the zeolite synthesis solution to form zeolite crystals within the patterned structures. Next, in step 25 the substrate comprising the zeolite crystals is rinsed and dried. Additionally (optional) to step 25 mechanical forces can be applied to remove non-incorporated or non-attached zeolite crystals from the substrate. Finally, in step 26, the zeolite crystals are heated in the presence of a carbon comprising gas at temperatures preferably in the range of 350° C. up to 1000° C.

According to preferred embodiments of the first aspect a substrate comprising patterned structures (openings) wherein said patterned structures comprise zeolite crystals and further comprise carbon nanostructures within the pores of the zeolite crystals and wherein the carbon nanostructures have an orientation in the direction defined by the confinement of the patterned structures is disclosed. The patterned structures may be trenches or via holes in a semiconductor device.

According to a second aspect, methods are provided to form carbon nanostructures within the pores of zeolite crystals by first incorporating an organo-metal complex in the pores of the zeolite crystals and then performing a thermal treatment to grow carbon nanostructures. This leads to an improved method to grow carbon nanostructures (e.g. CNT) within the pores of a zeolite crystal. The improved method gives rise to significantly higher yields of intraporous nanocarbon growth compared to the prior art techniques.

According to preferred embodiments of the second aspect the organo-metal complex may be introduced in the zeolite crystal pores by impregnation or in-situ synthesis.

The organo-metal complex of the preferred embodiments is preferably a (metallo)-phthalocyanine complex. Phthalocyanines may be incorporated in extra large pore zeolites such as VFI type zeolites and can be converted into carbon nanostructures under pyrolysis conditions. Preferred examples of suitable phthalocyanine complexes are Ni—, Fe—, Co—, or even H2-phthalocyanine complexes. For example Fe-phthalocyanine may be added to the zeolite by evaporating a solid source or precursor of phthalocyanine and Fe which will recombine within the porous structure of the zeolite crystal to form a Fe-phthalocyanine within the pores of the zeolite crystal. The stacking of the phthalocyanine complexes within the pores of the zeolite crystal is responsible for the necessary high carbon density for intraporous nanotube growth, and also the optional presence of transition metal catalyst.

According to embodiments of the second aspect, the improved method to grow the carbon nanostructures (e.g. CNT) within the pores of a zeolite crystal comprises at least the steps of: providing a zeolite synthesis solution or gel followed by, applying hydrothermal conditions to crystallize the zeolite synthesis solution to form zeolite crystals, heating the zeolite crystals and evaporating or impregnating a solid source or precursor of phthalocyanine and a metal at a temperature between room temperature up to 400° C. such that the phthalocyanine and the metal form a metal-phthalocyanine complex within the pores of the zeolite crystals, growing carbon nanostructures using the metal-phthalocyanine complex as an initiator by heating at a temperature between 350-1000° C.

Figure 1C:
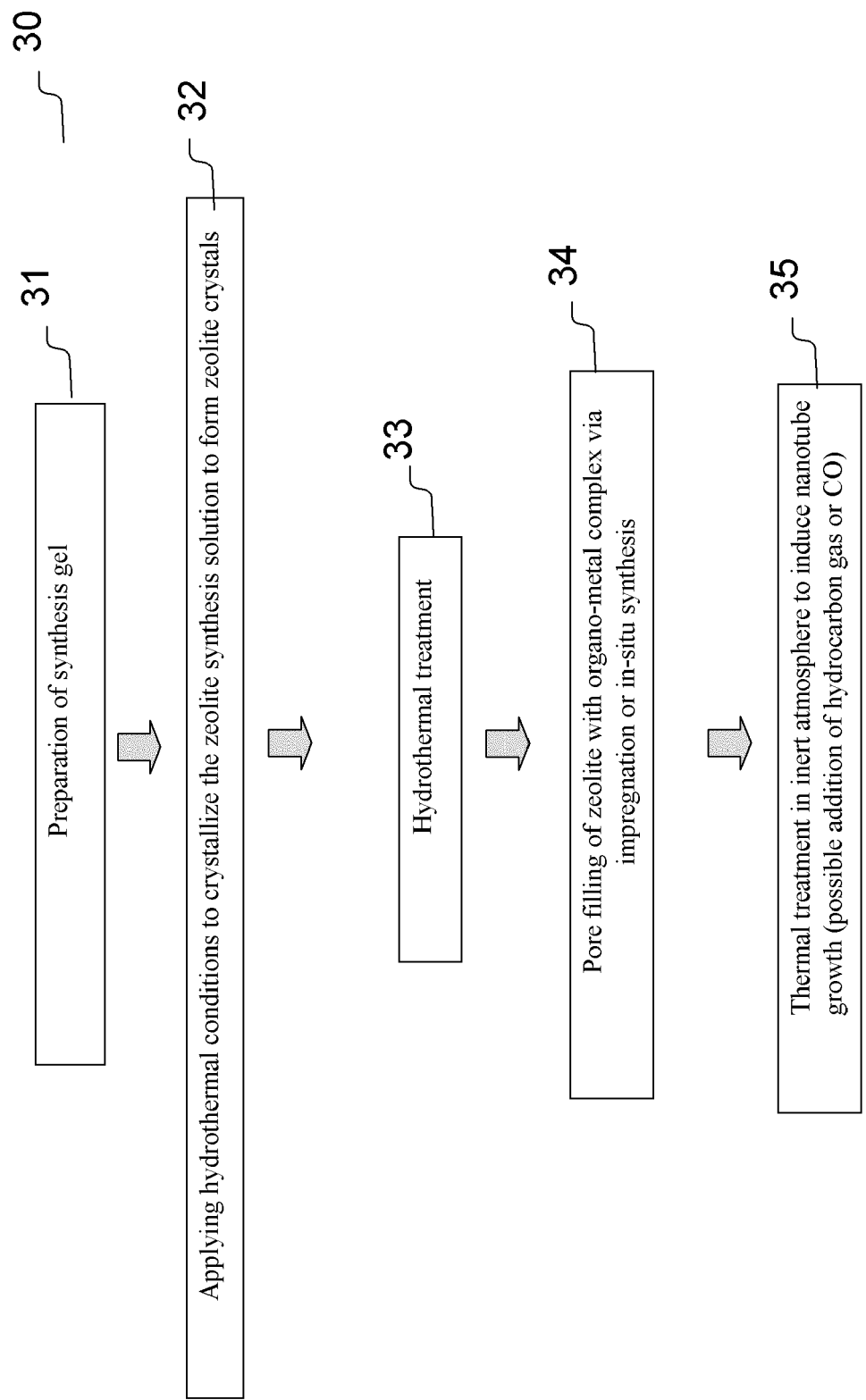
FIG. 1C is a flow diagram illustrating the different steps to synthesize carbon nanostructures within the pores of zeolite crystals using organo-metal complexes according to preferred embodiments.

FIG. 1C is a flowchart 30 illustrating the processing steps to form carbon nanostructures within the pores of zeolite crystals by first incorporating an organo-metal complex in the pores of the zeolite crystals and then performing a thermal treatment to grow carbon nanostructures according to preferred embodiments of the second aspect. In a first step 31 a synthesis gel suitable for forming zeolite crystals is provided according to state of the art methods. In a next step 32 hydrothermal conditions are applied (heating) to crystallize the zeolite synthesis solution to form zeolite crystals. Next, in step 33 the zeolite crystals are heated and a solid source or precursor of phthalocyanine and a metal are evaporated and impregnated in the pores of the zeolite structure, preferably in the temperature range of room temperature up to 400° C. In a next step 34 carbon nanostructures are grown using the metal-phthalocyanine complex as an initiator by heating at a temperature between 350-1000° C. Optionally hydrocarbon or CO gas can be added to the reactor in step 34 to initiate the growth of carbon nanostructures.

Figure 10:
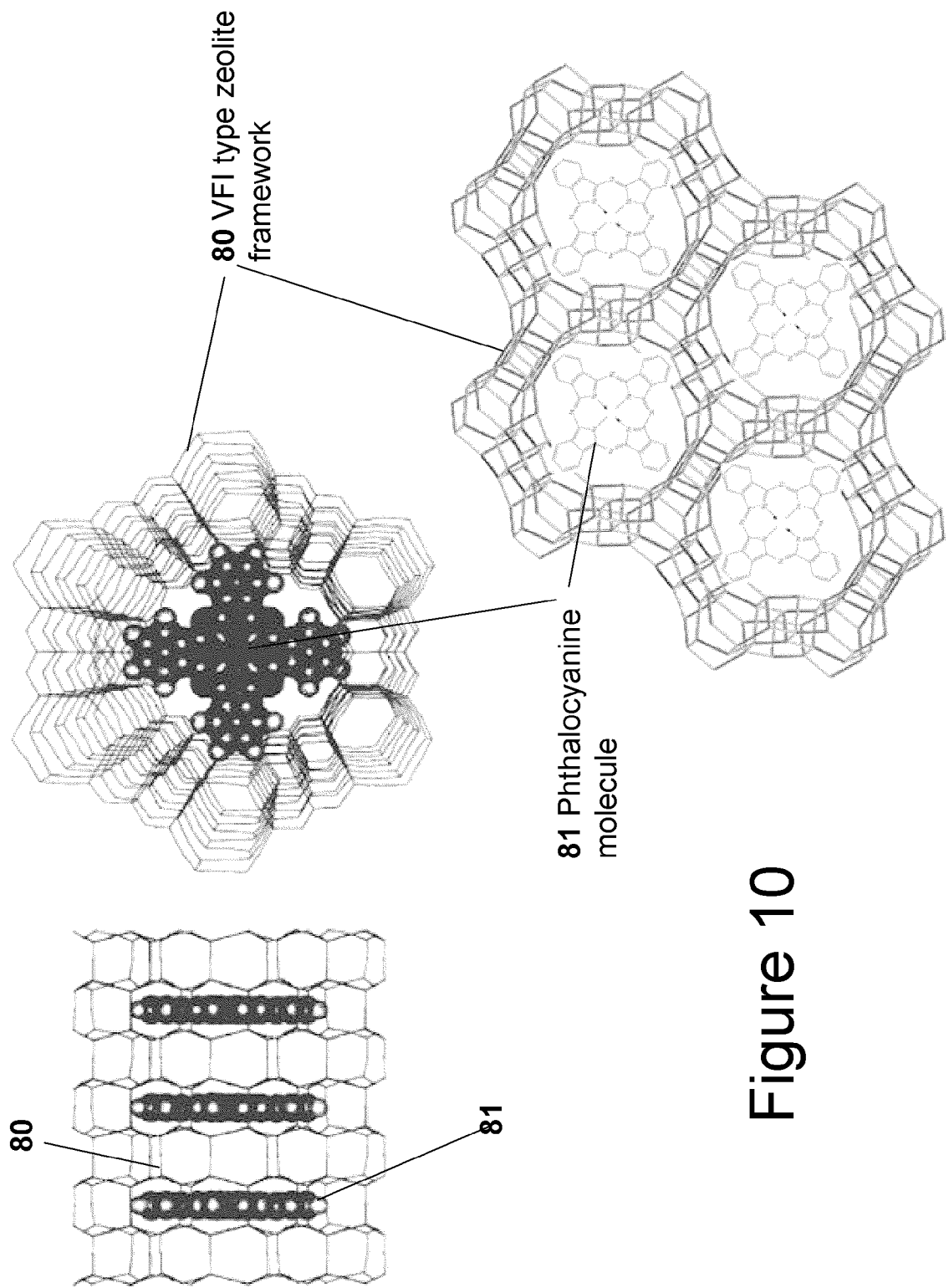
FIG. 10 shows a phthalocyanine complex incorporated inside a VPI-5 zeolite crystal pore via in-situ synthesis. The Figure is taken from prior art reference Parton et al., (1994), Journal of Molecular Catalysis A: Chemical, 97: 183-186.

FIG. 10 shows a phthalocyanine complex 81 incorporated inside a VPI-5 zeolite crystal 70 pore via in-situ synthesis. The Figure is taken from prior art reference Parton et al., (1994), Journal of Molecular Catalysis A: Chemical, 97: 183-186.

Figure 11:
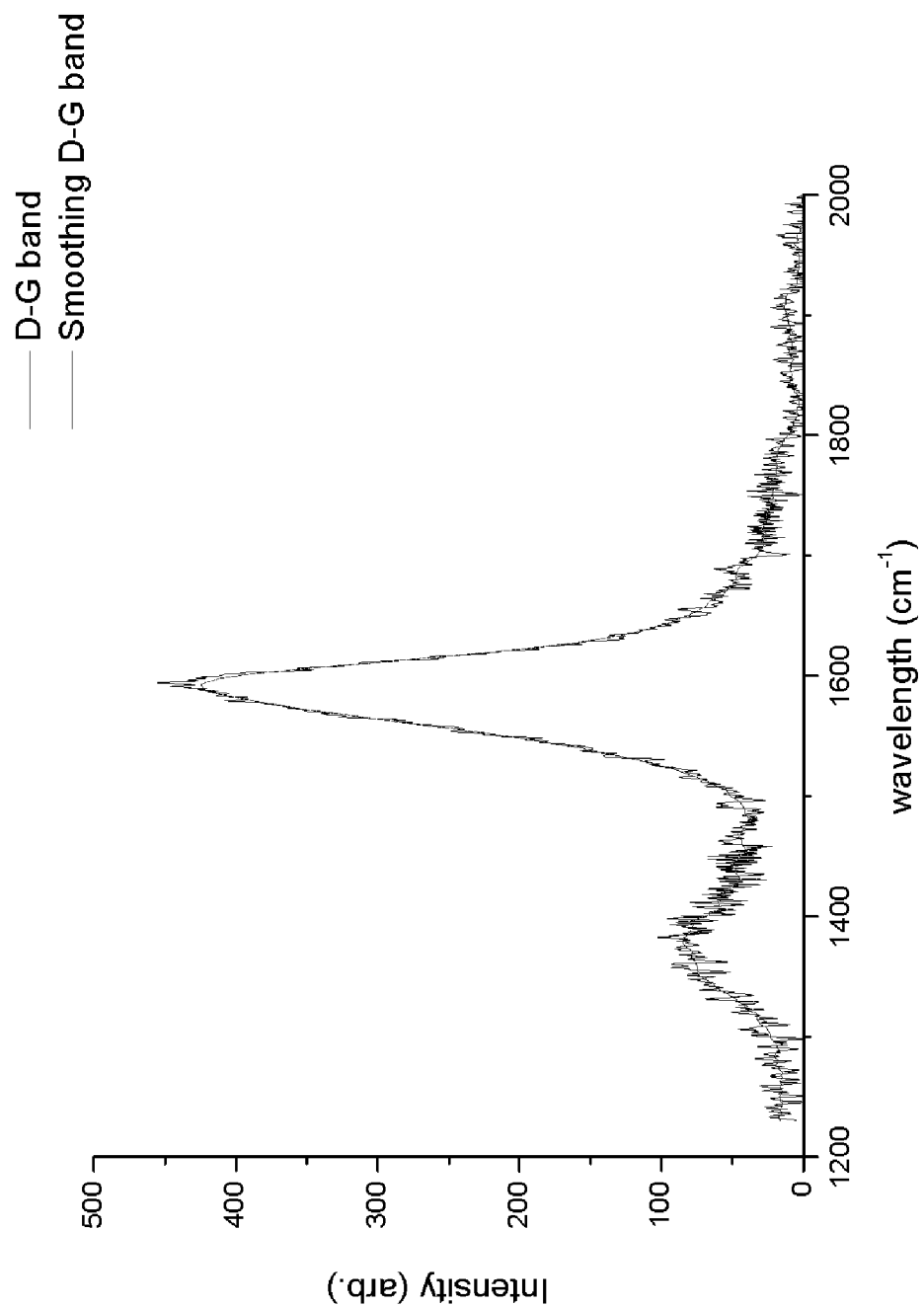
FIG. 11 shows a Raman spectrum of the phthalocyanine incorporated VPI-5 after pyrolysis.

FIG. 11 shows a Raman spectrum of the phthalocyanine incorporated VPI-5 after pyrolysis. The improved method to grow the carbon nanostructures (e.g. CNT) within the pores of a zeolite crystal according to the second aspect is compatible with the method to grow zeolite crystals within patterned structures as described in embodiments of the first aspect above.

The method according to the second aspect to grow carbon nanostructures within the pores of a zeolite crystal using metal-organo complexes can be combined with the method according to the first aspect to provide zeolite crystals in a patterned structure. A preferred embodiment utilizes preferred method steps used to form elongated carbon nanostructures (e.g. carbon nanotubes) within the pores of the zeolite crystals situated in a patterned structure.

According to preferred embodiments of the first and second aspect, a method is provided for growing (aligned) carbon nanostructures within the pores of zeolite crystals within patterned structures. The method comprises at least the steps of: providing a substrate comprising in its top surface patterned structures (openings), impregnating a zeolite synthesis solution or gel onto the substrate followed by, applying mechanical forces to incorporate the synthesis solution into the patterned structures, applying hydrothermal conditions to crystallize the zeolite synthesis solution to form zeolite crystals, rinsing and drying the substrate, and optionally applying additional mechanical forces to remove non-incorporated or non-attached zeolite crystals, heating the zeolite crystals and evaporating or impregnating a solid source or precursor of phthalocyanine and a metal at a temperature between 0° C.-400° C. such that the phthalocyanine and the metal are forming a metal-phthalocyanine complex within the pores of the zeolite crystals, and growing carbon nanostructures using the metallo-phthalocyanine complex as an initiator by heating at a temperature between 350-1000° C.

Figure 1D:
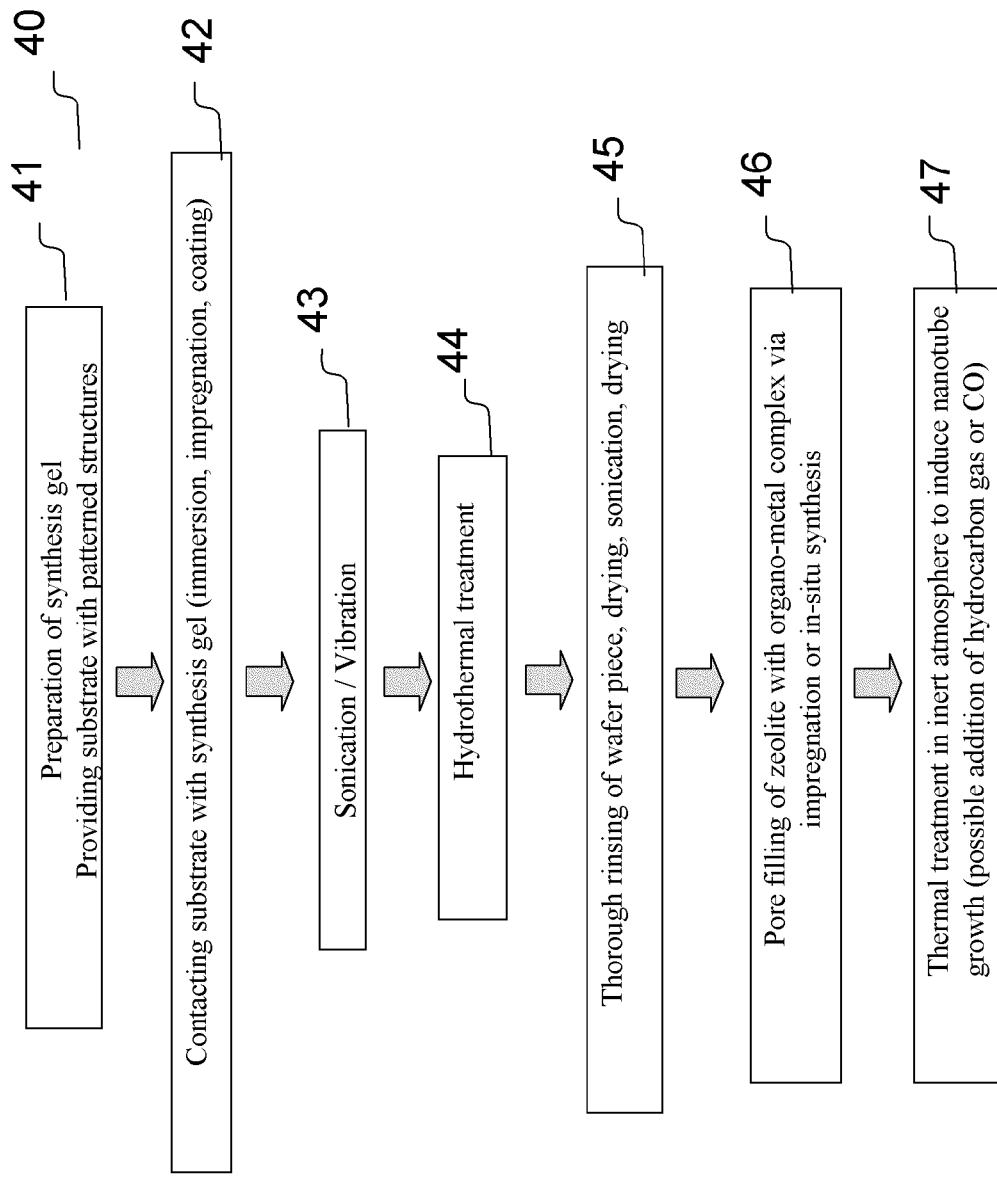
FIG. 1D is a flow diagram illustrating the different processing steps to synthesize zeolite crystals within patterned structures and subsequent growth of carbon nanostructures within the pores of the zeolite crystals using organo-metal complexes according to preferred embodiments.

FIG. 1D is a flowchart 40 illustrating the preferred processing steps to first synthesize zeolite crystals within patterned structures followed by growth of carbon nanostructures in the pores of the zeolite crystals according to preferred embodiments. In a first step 41 the synthesis gel suitable for forming zeolite crystals and a substrate (e.g. wafer) comprising patterned structures (openings) in its top surface are provided according to state of the art methods. In a next step 42 the synthesis gel is contacted with the substrate by known methods such as immersion (dipping) of the substrate in the synthesis gel or coating of the synthesis gel onto the top surface of the substrate. In a next step 43 mechanical forces such as sonication and/or vibration are used to incorporate the synthesis solution into the patterned structures. In yet another next step 44 hydrothermal conditions are applied (heating) to crystallize the zeolite synthesis solution to form zeolite crystals within the patterned structures. Next, in step 45 the substrate comprising the zeolite crystals is rinsed and dried. Additionally (optional) to step 45 additional mechanical forces can be applied to remove non-incorporated or non-attached zeolite crystals from the substrate. In step 46, the zeolite crystals are heated and a solid source or precursor of phthalocyanine and a metal are evaporated or impregnated at a temperature between 0° C. up to 400° C. such that the phthalocyanine and the metal are forming a metal-phthalocyanine complex within the pores of the zeolite crystals. In step 47 carbon nanostructures are grown within the pores of the zeolite crystals using the metallo-phthalocyanine complex as an initiator by heating at a temperature between 350° C.-1000° C.

Using the method according to preferred embodiments of the first and second aspect it is possible to direct the zeolite crystal growth (and hence orient the pores within the structure of the zeolite) in a direction defined by the confinement of the patterned structures such that carbon nanostructures grow in a direction defined by the confinement of the structures. In other words the growth of the carbon nanostructures may be defined by the geometric parameters (depth versus length) of the patterned structure. In this way it is possible to achieve direct vertical growth of the carbon nanostructures in a via (vertical hole) and direct horizontal growth of the carbon nanostructures in a trench (horizontal line). FIG. 9 illustrates (SEM image) a horizontally aligned zeolite crystal 53 having carbon nanostructures 54 within the pore of the zeolite crystal grown in trench structure 51 in BEST02 patterned structures.

According to preferred embodiments of the first and second aspect, a substrate is disclosed comprising patterned structures (openings) wherein said patterned structures comprise zeolite crystals and further comprise carbon nanostructures within the pores of the zeolite crystals and wherein the carbon nanostructures have an orientation in the direction defined by the confinement of the patterned structures.

The substrate comprising patterned structures (openings) wherein said patterned structures comprise zeolite crystals and further comprise carbon nanostructures within the pores of the zeolite crystals and wherein the carbon nanostructures have an orientation in the direction defined by the confinement of the patterned structures according to preferred embodiments of the first and second aspect may be used as interconnect structures in a semiconductor device.

FIGS. 2A and 2B illustrate a cross section of a substrate 50 having patterned structures 51 (openings) e.g. a BEST02 pattern with impregnated synthesis gel 52 on top of the substrate 51. FIG. 2C illustrates a cross section of the substrate 50 having patterned structures 51 after sonication (vibration) and hydrothermal treatment to obtain zeolite crystals 53 inside the patterned structures 51. FIG. 2D illustrates a cross section of the substrate having patterned structures 51 filled with zeolite crystals 53 after performing pyrolysis to obtain carbon nanostructures 54 inside the pores of the zeolite crystals 53.

According to preferred embodiments of the first and second aspect, the substrate may be any suitable substrate which is chosen in function of further applications. For semiconductor applications (use within a semiconductor device) the substrate may be a semiconductor substrate such as a Si or Ge wafer.

According to preferred embodiments of the first and second aspect, the patterned structures may be trenches or via holes which may be patterned in a dielectric layer having a k value lower than 5. FIG. 12A to FIG. 12C shows a patterned structure design (a Si wafer having vias etched in a dielectric layer deposited on top of the wafer) according to the BEST02 test structure and used in the examples 1 to 5. FIG. 12A is a SEM photo illustrating a top view of the Si wafer substrate 80 comprising the test structures, FIG. 12B illustrates a more detailed top view of the wafer substrate 80 illustrating the via holes 81 etched in a dielectric layer 82. FIG. 12C illustrates a cross section of the via holes 81 in the Si substrate with a Ti/TiN contact electrode at the bottom of the vias 81. Examples of suitable dielectric layers 82 are silicon dioxide and other state of the art low-k materials such as Black Diamond (Applied Materials). The patterning of the structures may be achieved using a combination of photolithographic imaging and (anisotropic) dry etching. To be used in BEOL as interconnect structures, the trenches and vias have preferably a diameter in the range of 50 nm up to 300 nm. Trenches have an aspect ratio (length/depth) greater than 1 whereas vias have an aspect ratio (length/depth) smaller than 1. To be used as deep vias in 3 dimensional (3D) wafer stacking, the vias have preferably a width in the range of 1 µm up to 10 µm and a depth into the substrate in the range of 10 µm up to 100 µm. More preferred said deep vias are high aspect ratio vias having width of 5 µm and a depth of 50 µm.

According to preferred embodiments of the first and second aspect, the patterned structure may be a single level mask structure with vias ranging from 50 nm up to 300 nm in diameter. In order to allow electrical characterization or electrical contact of the carbon nanostructures in an individual via and/or an array of vias, the vias may land on a single common bottom electrode that can be made from a suite of different materials. An example of a suitable bottom contact electrode material is TiN. Using a simple patterned structure design facilitates the vertical CNT growth in zeolites confined within the vias, their integration with the bottom contact and top-metallization to enable consequent electrical contact of the CNT.

According to preferred embodiments of the first and second aspect the zeolite synthesis solution or gel may comprise a silicon source and an alkali source of inorganic or organic nature, and optionally a template molecule and hetero-elements such as Al, Ga, Ti, Fe, Co, Ge, P, or a mixture thereof.

According to preferred embodiments of the first and second aspect the zeolite synthesis solution or gel may comprise an aluminum and phosphorus source, as well as a source of acidity, and a template molecule and optionally hetero-elements such as Si, Ga, Ti, Fe, Co, Ge, or a mixture thereof. As an example for the SAPO-5 zeolite type material (also referred to as AFI type) aluminum-isopropoxide is used as an aluminum source, phosphoric acid as a phosphorus source, tripropylamine (TPA) as template, and Aerosil200 (Degussa) as a silica source. The synthesis gel is preferably a water-based solution; alcohols such as ethanol may be added to improve the wetability of the gel. An optimized synthesis gel for a silico-aluminophosphate may have the following composition:1 Al2O3:0.99 P2O5:1.2 TPA:400 H2O:20 Ethanol: 0.01 SiO2.

According to preferred embodiments of the first and second aspect, the organo-metal complex, used for impregnation or in-situ synthesis in the zeolite pores, may consist of a transition metal in comprising Fe, Ni or Co and any organic ligand that sterically can be accommodated in the zeolite pores.

According to preferred embodiments of the first and second aspect the zeolite can be a crystalline porous material with parallel pores, preferably with one of the following structure types, as defined by the International Zeolite Association: AFI, VFI type material. Alternatively an AEL type, AET type, AFO type, AFR type, AFS type, AFY type, ASV type, ATO type, ATS type, *BEA type, BEC type, BOG type, BPH type, CAN type CFI type, -CLO type, CON type, DON type, DFO type, EMT type, EON type, ETR type, EUO type, EZT type, FAU type, FER type, GME type, GON type, IFR type, IMF type, ISV type, IWR type, IWV type, IWW type, LTA type, LTL type, MAZ type, MEI type, MEL type, MFI type, MFS type, MOR type, MOZ type, MSE type, MTT type, MTW type, MWW type, OFF type, OSI type, OSO type, PON type, RRO type, RWY type, SAO type, SBE type, SBS type, SBT type, SFE type, SFF type, SFG type, SFH type, SFN type, SFO type, SOS type, SSY type, STF type, SZR type, TER type, TON type, TUN type, USI type, UTL type, or VET type material can be used.

According to preferred embodiments of the first and second aspect the mechanical forces used to incorporate the synthesis gel are selected from sonication, vibration and/or spin-coating. Sonication may be used to incorporate the synthesis gel into the patterned structures, suitable sonication condition are e.g. 15 minutes at 47 kHz. Spin-coating may be used to remove excess of synthesis gel from the substrate, suitable spin-coating condition are e.g. 15000 rpm for 10 seconds.

According to preferred embodiments of the first and second aspect the hydrothermal treatment is used to crystallize the synthesis gel and thereby forming (ordered) zeolite crystals. Suitable hydrothermal conditions comprise the heating of the substrate under autogeneous pressure for 2-48 h at 100-200° C., more preferably for 14-15 h at 150-180° C.

According to preferred embodiments of the first and second aspect the rinsing and drying is performed using doubly-distilled water.

According to preferred embodiments of the first and second aspect the additional mechanical forces needed to remove non-incorporated or non-attached zeolite crystals is performed using sonication. After the sonication, the substrate is preferably again thoroughly rinsed with doubly-distilled water.

According to preferred embodiments of the first and second aspect the step of growing the carbon nanostructures is such that vertical growth of carbon nanostructures is achieved in a via (vertical hole) and horizontal growth of carbon nanostructures is achieved in a trench (horizontal line).

According to preferred embodiments of the first and second aspect the step of growing the carbon nanostructures is achieved using high temperature pyrolysis conditions. The carbon source needed for the nanostructure synthesis may originate from the organic template molecule used for zeolite synthesis. Alternatively (or additionally) a carbon containing gas may be added to the atmosphere under pyrolysis conditions (possibly in high pressure conditions). Yet another alternative is the formation of organo-metal complexes within the porous structure of the zeolite crystal (such as metal phthalocyanine complexes) leading to a stacking of these organo-metal complexes inside the zeolite pores.

According to preferred embodiments of the first and second aspect the pyrolysis step used to grow carbon nanostructures is performed within a thermal reactor e.g. a furnace. The reactor must be capable of heating the zeolite crystals to a temperature up to 1000° C. The thermal reactor preferably includes a chamber that can be maintained at vacuum or at a desired pressure, and further includes means for enabling a gas flow into the chamber. Preferred pyrolysis may be the heating of the zeolite crystals under a flow of inert gas. Then keep the zeolite crystals isothermal at 400-900° C. for 10-3600 min, more preferably at 550° C. for 50-150 min.

Methods according to preferred embodiments will hereinafter be illustrated by some experiments. It has to be understood that these experiments are only illustrative and are not intended to limit the invention in any way.

EXAMPLES

Example 1

Incorporation/in Situ Growth of Zeolite Crystals in via Holes Using Sonication

In a typical synthesis procedure for the SAPO-5 aluminum isopropoxide was used as an aluminum source, phosphoric acid as a phosphorus source, tripropylamine (TPA) as template, and Aerosil200 (Degussa) as a silica source. An optimized synthesis gel has the following composition: 1 $Al_2O_3$: 0.99 $P_2O_5$:1.2 TPA:400 $H_2O$:20 Ethanol:0.01 $SiO_2$. A patterned wafer piece, with via holes of 50 nm-200 nm diameter, is immersed in the synthesis gel, thereafter beaker with both synthesis gel and wafer piece are put in a sonication bath for 15' at 47 kHz. Excess synthesis gel is removed via a spin coating procedure, using 15000 rpm for 10 s. The crystallization is carried out under autogeneous pressure for 14h-15 h at 180° C. Afterwards, the autoclaves are cooled in air, and the wafer piece is thoroughly rinsed with doubly-distilled water. The wafer piece is again sonicated to remove the non attached crystals, and again thoroughly rinsed with doubly-distilled water.

Example 2

Comparative Example

Figure 7:
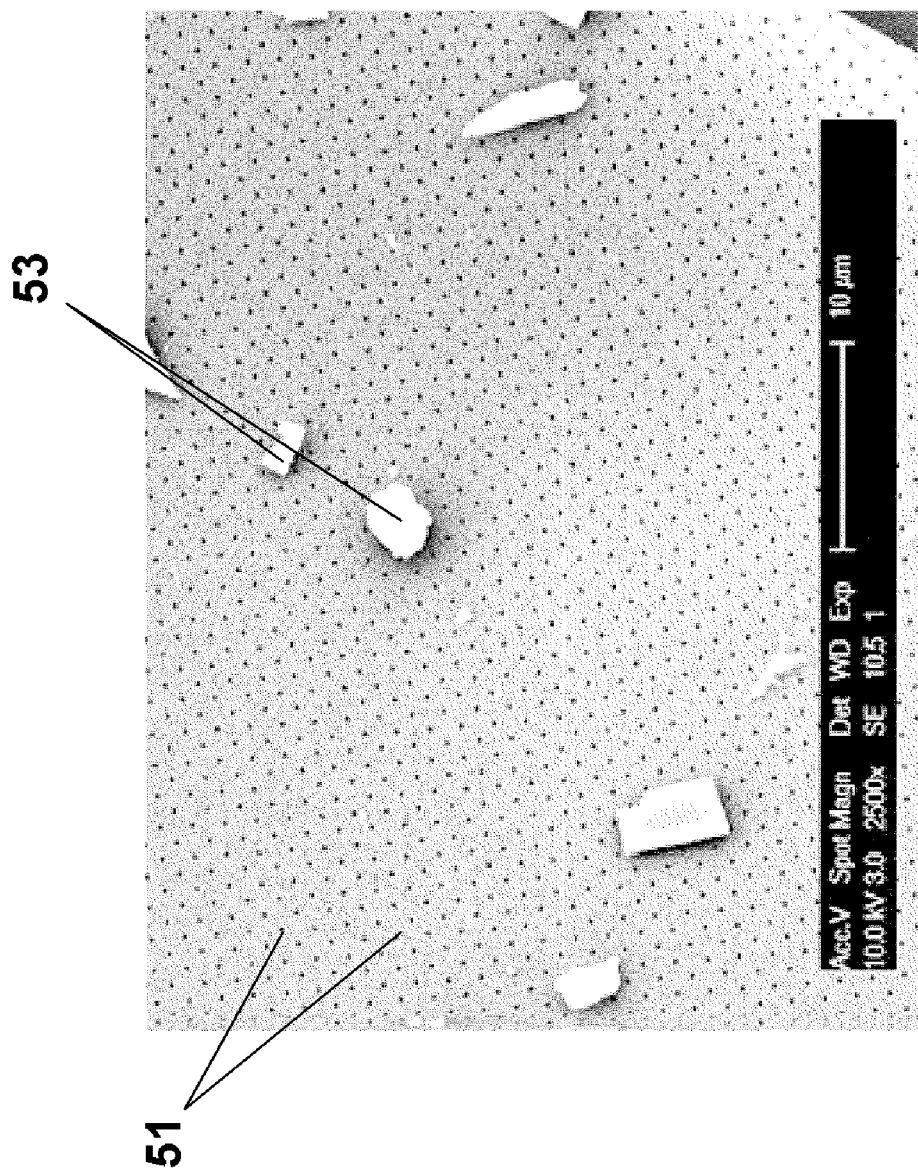
FIG. 7 is a comparative example showing a SEM image of zeolite crystals grown on BEST02 patterned wafer without performing the sonication and/or spin coating step.
Figure 8:
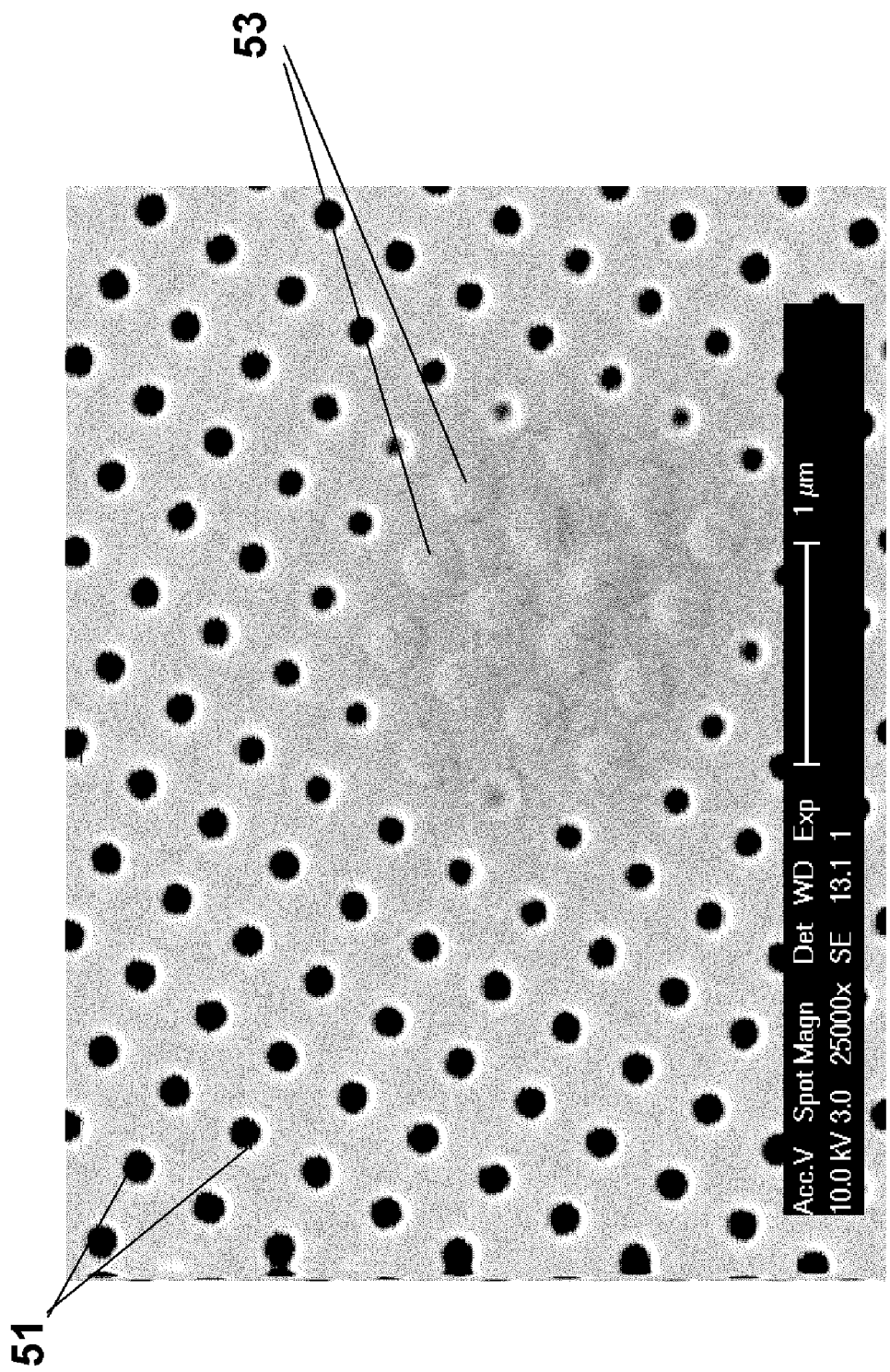
FIG. 8 is SEM image of zeolite crystals grown in BEST02 patterned structures using sonication and spin coating step (on part of the wafer substrate to visualize the filling effect).

Incorporation/in Situ Growth of Zeolite Crystals in via Holes Without Using Sonication In a typical synthesis procedure for the SAPO-5 aluminum-isopropoxide was used as an aluminum source, phosphoric acid as a phosphorus source, tripropylamine (TPA) as template, and Aerosil200 (Degussa) as a silica source. An optimized synthesis gel has the following composition: 1 $Al_2O_3$:0.99 $P_2O_5$:1.2 TPA:400 $H_2O$:20 Ethanol:0.01 $SiO_2$. A patterned wafer piece, with via holes of 50 nm-200 nm diameter, is immersed in the synthesis gel. The crystallization is carried out under autogeneous pressure for 14 h-15 h at 180° C. Afterwards, the autoclaves are cooled in air, and the wafer piece is thoroughly rinsed with doubly-distilled water. The wafer piece is again sonicated to remove the non attached crystals, and again thoroughly rinsed with doubly-distilled water. No or very few crystals grow inside via holes, indicating that the sonication step is crucial for the synthesis of confined crystal growth in BEST02 via holes and trenches. FIG. 7 is a comparative example showing a SEM image of zeolite crystals grown on BEST02 patterned wafer without performing the sonication and/or spin coating step.

Example 3

Comparative Example

In a typical synthesis procedure for the SAPO-5 aluminum-isopropoxide was used as an aluminum source, phosphoric acid as a phosphorus source, tripropylamine (TPA) as template, and Aerosil200 (Degussa) as a silica source. An optimized synthesis gel has the following composition: 1 $Al_2O_3$:0.99 $P_2O_5$:1.2 TPA:400 $H_2O$:20 Ethanol:0.01 $SiO_2$. A patterned wafer piece, with via holes of 50 nm-200 nm diameter, is immersed in the synthesis gel, thereafter beaker with both synthesis gel and wafer piece are put in a sonication bath for 15' at 47 kHz. The crystallization is carried out under autogeneous pressure for 14 h-15 h at 180° C. Afterwards, the autoclaves are cooled in air, and the wafer piece is thoroughly rinsed with doubly-distilled water. The wafer piece is again sonicated to remove the non attached crystals, and again thoroughly rinsed with doubly-distilled water.

Large zeolite crystals grow on top of the wafer, forming a crust. As there is no depletion of nutrients during zeolite growth, and once confinement effect of via hole or trench is gone, large crystal growth can be seen. The orientation of the crystal seems to be directed by the pattern. The cohesion of the zeolite crystals is larger than the adhesion zeolite-wafer, therefore zeolite "roots" are for a large part removed from the via holes during post synthesis sonication. It can be seen that filling degree is very good when looking at a bottom side of zeolite crust, but as large crystals get detached during post synthesis sonication, they take their "roots" with them.

Example 4

Growth of CNT Using Organo-metal Complex after Crystallization of the Zeolite The synthesis of Si-VPI-5 was successful using a slightly adapted procedure from Martens et al. [Catalysis Letters, (12) 367-374, 1991]. From a gel with composition 1 $Al_2O_3$:1.05 $P_2O_5$:2 TBA:0.2 DPTA:40 $H_2O$:0.2 $SiO_2$, via sol-gel chemistry, pure Si-VPI-5 phase is obtained. First the Al-source, pseudoboehmite, and the P-source, phosphoric acid, are hydrated with 60% and 40% of the water, respectively. The diluted phosphoric acid is added dropwise to the Al-sol. The gel is put in a hot-water bath (95° C.) for 25 minutes, and is then further aged for 165 minutes at room temperature. After the two ageing periods, the templates are added dropwise. Then the Si is added in the form of Ludox AS-40 in a single shot. The gel is gently stirred for another 5 minutes, and is the loaded in stainless steel autoclaves, together with a Teflon bead. The autoclaves are heated to 150° C. for 18 h while rotating. The obtained solid is separated by centrifugation, and then thoroughly washed with water. The powder is dried in an oven at 30° C. Phthalocyanines are incorporated via in situ chemical synthesis. The VPI-5 powder is thoroughly mixed with 1,2-dicyanobenzene and ferrocene. This mixture is heated under He for 4 hours at 250° C. The material obtained is Soxhlet extracted successively with acetone, dimethylformamide and again acetone until solvent remained colorless. This powder is then heated under He flow for 2 hours at 600° C. to obtain carbon nanostructures in the VPI-5 pores. Carbon nanostructures are achieved up to 10 wt % without addition of carbon containing gas during pyrolysis, which outperforms prior art [US2006/0051674]. Pore filling degrees of nanocarbon have been reported up tot 18% nanocarbon without addition of carbon containing gas during pyrolysis procedure, and up to 28% with addition of carbon containing gas during pyrolysis. Already, without addition of hydrocarbon gas, pyrolysis of incorporated Fe-phthalocyanine yields 60% pore filling degree of nanocarbon. Raman spectroscopy gives low $I_D/I_G$ ratio of 0.25, indicating high quality of formed nanocarbon. Also a RBM band, typical for the presence of SWCNT, is detected. Diameters calculated from RBM agree very well with pore sizes of VFI framework.

Example 5

Comparative Example

After synthesis of Si-VPI-5 some organic template molecule is still present in the framework pores. This however cannot be used, as opposed to AlPO-5 (AFI), as a carbon source for nanotube synthesis. Pyrolysis of organic template molecule for VFI synthesis does not result in nanocarbon formation. This shows the necessity of the incorporation of (metallo-) phthalocyanine complexes in the VFI framework, proving the novelty of the invented method.

Example 6

Details on the Test Structure Patterned Design (BEST 02)

The patterned structure used here, the so-called BEST 02 test structure, is a single level mask structure with vias ranging from 50-300 nm in diameter and with 3 different pitches. In order to allow simple electrical characterization of an individual via and an array of vias, the vias land on a single common bottom electrode that can be made from a suite of different materials. TiN is a suitable material and is chosen as bottom contact material in the test structure. This simple test structure design therefore facilitates the vertical CNT growth in zeolites confined within the vias, their integration with the bottom contact and top-metallization to enable consequent electrical testing of the CNT.

The particular details of the test structure include: via (contact) holes 50-300 nm diameter; and use of a standard process meaning that vias are etched only down to 150 nm diameter.

Each reticle matrix contains three arrays of via holes of different pitch: dense contact holes, with via pitch equal to 2 times the via diameter→8000 (300 nm) to 17000 (150 nm) rows, 81 column; semi-dense contact holes, with via pitch equal to 2.4 times the via diameter→7000 (300 nm) to 14000 (150 nm) rows, 96-98 columns; and isolated contact holes, with via pitch equal to 6 times the via diameter→2400 (300 nm) to 4800 (150 nm) rows, 281 columns.

FIG. 12A to FIG. 12C illustrates SEM pictures of the test structure design according to the BEST02 design as described above and used in the examples 1 to 5.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A substrate comprising patterned structures, wherein the patterned structures are filled with zeolite crystals and wherein the zeolite crystals and thus pores within the zeolite crystals have an orientation in a direction defined by confinement of the patterned structures.

2. The substrate of claim 1, wherein the patterned structures are selected from the group consisting of:
   trenches or via holes patterned in a dielectric layer having a k value lower than 5;
   trenches or via holes patterned using a combination of photolithographic imaging and anisotropic or non-anisotropic dry etching;
   trenches or via holes in a semiconductor device, wherein the trenches or vias have a diameter in the range of 50 nm up to 300 nm; and
   combinations thereof 3. A method for preparing a substrate comprising patterned structures according to claim 1, the method comprising:
   impregnating a zeolite synthesis solution or a zeolite synthesis gel onto a substrate comprising patterned structures in its top surface;
   applying mechanical force to incorporate the synthesis solution or the zeolite synthesis gel into the patterned structures;
   applying hydrothermal conditions to crystallize the zeolite synthesis solution or the zeolite synthesis gel, whereby zeolite crystals having a porous structure are formed;
   rinsing and drying the substrate; and
   applying additional mechanical force to remove non-incorporated or non-attached zeolite crystals from the substrate, wherein the patterned structures are filled with zeolite crystals and wherein the zeolite crystals and thus pores within the zeolite crystals have an orientation in a direction defined by confinement of the patterned structures.

4. The substrate of claim 2, wherein the dielectric layer is silicon dioxide or a low-k material.

5. The method of claim 3, wherein the mechanical force used to incorporate the synthesis solution is selected from the group consisting of sonication, vibration, spin-coating, and combinations thereof 6. The method of claim 3, further comprising, after formation of the zeolite crystals, a step of heating, at a temperature of from about 350° C. to about 1000° C., the zeolite crystals in an inert gas or a mixture of an inert gas and a carbon-containing gas, whereby carbon nanostructures are grown within the porous structure of the zeolite crystals.

7. The method of claim 3, further comprising, after formation of the zeolite crystals, steps of:
   adding an organo-metal to the zeolite crystals via impregnation or in-situ synthesis; followed by
   heating the zeolite crystals in an inert gas at a temperature of from about 350° C. to about 1000° C., whereby carbon nanostructures are grown within the porous structure of the zeolite crystals.

8. The method of claim 3, wherein the patterned structures are openings.

9. The method of claim 7, wherein the organo-metal complex is a (metallo)-phthalocyanine complex.

10. The method of claim 7, wherein the organo-metal complex is selected from the group consisting of Ni-phthalocyanine complexes, Fe-phthalocyanine complexes, Co-phthalocyanine complexes, and $H_2$-phthalocyanine complexes.

11. A substrate comprising patterned structures, wherein the patterned structures comprise zeolite crystals and carbon nanostructures within pores of the zeolite crystals, and wherein the carbon nanostructures have an orientation in a direction defined by a confinement of the patterned structures.

12. A method for preparing a substrate comprising patterned structures according to claim 11, the method comprising:
   providing a zeolite synthesis solution or a zeolite synthesis gel on a substrate comprising patterned structures in its top surface;
   applying hydrothermal conditions whereby the zeolite synthesis solution or the zeolite synthesis gel is crystallized to form at least one zeolite crystal;
   adding an organo-metal complex to the zeolite crystal via impregnation or in-situ synthesis; and
   heating the zeolite crystal in an inert gas at a temperature of from about 350° C. to about 1000° C., whereby carbon nanostructures are grown within pores of the zeolite crystal, wherein the patterned structures comprise zeolite crystals and carbon nanostructures within pores of the zeolite crystals, and wherein the carbon nanostructures have an orientation in a direction defined by a confinement of the patterned structures.

13. The substrate of claim 11, wherein the patterned structures are openings.

14. The substrate of claim 11, wherein the patterned structures are trenches or via holes in a semiconductor device.

15. The substrate of claim 11, wherein the patterned structures are trenches or via holes patterned in a dielectric layer having a k value lower than 5.

16. The substrate of claim 11, wherein the patterned structures are trenches or via holes, and wherein the carbon nanostructures within the pores of the zeolite crystals are interconnect structures in a semiconductor device.

17. The substrate of claim 11, wherein the patterned structures are openings.

18. The substrate of claim 11, wherein the substrate is an interconnect structure in a semiconductor device.

19. The method of claim 12, wherein the organo-metal complex is a (metallo)-phthalocyanine complex.

20. The method of claim 12, wherein the organo-metal complex is selected from the group consisting of Ni-phthalocyanine complexes, Fe-phthalocyanine complexes, Co-phthalocyanine complexes, and $H_2$-phthalocyanine complexes.

* * * * *

UNITED STATES PATENT AND TRADEMARK OFFICE
CERTIFICATE OF CORRECTION

PATENT NO. : 7,790,600 B2
APPLICATION NO. : 12/358063
DATED : September 7, 2010
INVENTOR(S) : Jacobs et al.

It is certified that error appears in the above-identified patent and that said Letters Patent is hereby corrected as shown below:

| Column | Line | |
|---|---|---|
| 2 | 49 | After "structure" insert --,--. |
| 19 | 62 | In Claim 2, after "thereof" insert --.--. |
| 20 | 20 | In Claim 5, after "thereof" insert --.--. |

Signed and Sealed this
Twenty-second Day of February, 2011

David J. Kappos
*Director of the United States Patent and Trademark Office*